(12) United States Patent  
Yodo et al.

(10) Patent No.: US 8,949,732 B2
(45) Date of Patent: Feb. 3, 2015

(54) SYSTEM AND METHOD FOR CORRESPONDING TABS TO CONTENT INFORMATION

(75) Inventors: Fumitake Yodo, Tokyo (JP); Yasuhiro Yamanaka, Chiba (JP); Yasushi Okumura, Tokyo (JP)

(73) Assignees: Sony Corporation, Tokyo (JP); Sony Computer Entertainmant Inc., Tokyo (JP)

( * ) Notice: Subject to any disclaimer, the term of this patent is extended or adjusted under 35 U.S.C. 154(b) by 204 days.

(21) Appl. No.: 13/033,581

(22) Filed: Feb. 23, 2011

(65) Prior Publication Data

US 2011/0145750 A1 Jun. 16, 2011

Related U.S. Application Data

(63) Continuation of application No. 11/380,890, filed on Apr. 28, 2006, now abandoned.

(30) Foreign Application Priority Data

Jun. 7, 2005 (JP) ................................. 2005-167568

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 3/0483* (2013.01)
USPC ........... 715/777; 715/764; 715/767; 715/776; 715/864

(58) Field of Classification Search
None
See application file for complete search history.

(56) References Cited

U.S. PATENT DOCUMENTS

| 4,959,643 A | 9/1990 | Taguchi et al. |
| 5,559,946 A | 9/1996 | Porter |

(Continued)

FOREIGN PATENT DOCUMENTS

| EP | 0843269 A2 * | 7/2004 |
| JP | 60-262241 | 12/1985 |

(Continued)

OTHER PUBLICATIONS

Opera Web Browser for Dummies, May 5, 2000, 3 pages.*

(Continued)

*Primary Examiner* — Matt Kim
*Assistant Examiner* — Yongjia Pan
(74) *Attorney, Agent, or Firm* — Fitch, Even, Tabin & Flannery LLP

(57) ABSTRACT

The present invention provides screen displaying technology allowing improvement in operability and convenience for the user. A screen display apparatus receives a content, displays a plurality of tabs in a display screen, corresponds content information to any one of the plurality of tabs, and displays the content information corresponding to a displaying tab. In the case of corresponding content information to a non-displaying tab other than the displaying tab, it is determined whether or not a there is a non-corresponded, non-displaying tab to which other content information is not corresponded, and when the non-corresponded, non-displaying tab does not exist, the non-displaying tab selected based on a predetermined selection condition and the content information are corresponded. Furthermore, the screen display apparatus calculates a progress status of at least one or more of receiving a content, generating a content image by drawing the content, and storing the content image in an image storage means, and then outputs the calculated progress status associated it with a tab corresponded to the content.

11 Claims, 23 Drawing Sheets

(51) Int. Cl.
*G06F 3/0483* (2013.01)
*G06F 3/14* (2006.01)

(56) References Cited

U.S. PATENT DOCUMENTS

| | | | |
|---|---|---|---|
| 5,949,413 A | 9/1999 | Lerissa et al. | |
| 6,049,812 A * | 4/2000 | Bertram et al. | 715/205 |
| 6,359,634 B1 | 3/2002 | Cragun et al. | |
| 6,370,552 B1 | 4/2002 | Bloomfield | |
| 6,801,227 B2 | 10/2004 | Bocionek et al. | |
| 7,017,119 B1 | 3/2006 | Johnston et al. | |
| 7,047,499 B2 * | 5/2006 | Ferri | 715/777 |
| 7,143,357 B1 * | 11/2006 | Snibbe et al. | 715/751 |
| 7,426,697 B2 | 9/2008 | Holecek et al. | |
| 7,774,366 B2 * | 8/2010 | Fisher et al. | 707/784 |
| 7,908,602 B2 * | 3/2011 | Alcorn et al. | 717/174 |
| 7,921,365 B2 * | 4/2011 | Sauve et al. | 715/738 |
| 7,921,372 B2 * | 4/2011 | Sauve et al. | 715/767 |
| 8,028,245 B2 * | 9/2011 | Yolleck et al. | 715/777 |
| 8,321,812 B2 * | 11/2012 | Morrison et al. | 715/853 |
| 2002/0130904 A1 * | 9/2002 | Becker et al. | 345/753 |
| 2002/0163545 A1 | 11/2002 | Hii | |
| 2003/0071849 A1 | 4/2003 | Ferri | |
| 2003/0197735 A1 * | 10/2003 | Woltzen | 345/777 |
| 2003/0222916 A1 | 12/2003 | Kuwata et al. | |
| 2004/0030719 A1 | 2/2004 | Wei | |
| 2004/0113948 A1 | 6/2004 | Shahrbabaki et al. | |
| 2005/0223324 A1 * | 10/2005 | Tashiro | 715/527 |
| 2005/0283738 A1 * | 12/2005 | Beringer et al. | 715/777 |
| 2006/0155728 A1 * | 7/2006 | Bosarge | 707/100 |
| 2006/0184872 A1 * | 8/2006 | Dontcheva et al. | 715/512 |
| 2006/0184875 A1 * | 8/2006 | Okada et al. | 715/516 |
| 2006/0218500 A1 | 9/2006 | Sauve et al. | |
| 2006/0271858 A1 | 11/2006 | Yolleck et al. | |
| 2006/0277472 A1 | 12/2006 | Yodo et al. | |
| 2007/0067733 A1 * | 3/2007 | Moore et al. | 715/777 |
| 2008/0189645 A1 | 8/2008 | Kapanen et al. | |
| 2010/0115451 A1 * | 5/2010 | Moore et al. | 715/777 |
| 2011/0161828 A1 * | 6/2011 | Sauve et al. | 715/738 |

FOREIGN PATENT DOCUMENTS

| | | |
|---|---|---|
| JP | 61-176985 | 8/1986 |
| JP | 10-040062 | 2/1998 |
| JP | 2000-030366 | 1/2000 |
| JP | 2000-172398 | 6/2000 |
| JP | 2002-041296 | 2/2002 |
| JP | 2002-268787 | 9/2002 |
| JP | 2003-186911 | 7/2003 |
| JP | 2004-086743 | 3/2004 |
| JP | 2004-335055 | 11/2004 |
| WO | 2004-084056 | 9/2004 |

OTHER PUBLICATIONS

Opera Software ASA—Opera version history, retrieved Nov. 4, 2012, 2 pages.*
Safari Beta 64 With Screenshots, Apr. 2, 2003, 4 pages.*
Opera like statusbar—with . . . , Oct. 23, 2004, 5 pages.*
Bug 169380—RFE: Add LED to tab labels to indicate tab load status, Mar. 28, 2004, 10 pages.*
Firefox Progress Bar, Aug. 7, 2004, 3 pages.*
How Can I Preload Images in Opera?, May 3, 2004, 7 pages.*
Opera Web Browser Updated to 7.5, May 12, 2004, 5 pages.*
Progress Bar Colour, Aug. 3, 2004, 5 pages.*
Progress Meter in Tabs, Nov. 29, 2003, 6 pages.*
Add LED to Tab Labels to Indicate Tab Load Status, Sep. 18, 2002, 10 pages.*
Local Progressbar for Each Tab (No Need to Constantly Switch Between Tabs to See What's Happening), Dec. 27, 2001, 3 pages.*
Fire Fox is the Best You Say? Prove it. (Massive List), Jul. 20, 2004, 13 pages.*
Rebuilding TBE's Featureset with Other Plugins, II, Nov. 25, 2004, 7 pages.*
Tabbrowser Extensions, Jan. 30, 2004, 26 pages.*
Tab Bar Size, Apr. 4, 2004, 2 pages.*
Tab Idea, Nov. 25, 2004, 7 pages.*
Firefox—userChrome.css, Nov. 22, 2006, 4 pages.*
A new, more flexible tabbed browsing control for Camino, Feb. 26, 2004, 23 pages.*
Japanese Patent Office; "Notification of Reasons for Refusal" issued in corresponding Japanese Application No. 2008-320158; dated Mar. 18, 2011; 4 pages (Includes English translation).
Japanese Patent Office; "Notification of Reasons for Refusal" issued in corresponding Japanese Application No. 2005-167568; dated Oct. 17, 2008; 6 pages (Includes English translation).
Nameless3.exe, Contribution Day, [online], Feb. 7, 2011, 2 channel, [Oct. 3, 2008 searching], Internet <http:yasai.2ch.net/win/kako/980/980439586.html>, p. 1 and p. 62.
Japanese Patent Office; "Notification of Reasons for Refusal" issued in corresponding Japanese Application No. 2005-167568; dated Feb. 27, 2009; 5 pages (Includes English translation).
Japanese Patent Office; "Decision of Rejection" issued in corresponding Japanese Application No. 2005-167568; dated May 22, 2009; 5 pages (Includes English translation).
Japanese Patent Office; "Notification of Reasons for Refusal" issued in corresponding Japanese Application No. 2005-167568; dated Feb. 25, 2011; 68 pages (Includes English translation).
Pocket PC Browser comparison, Apr. 28, 2003, http://webarchive.org/web/20030428134731/http://www.geekzone.co.nz/content.asp?contentid=505.
Tabbrowser Extensions, Mar. 8, 2005, http://web.archive.org/web/20050308111512/http://www.extensionsmirror.nl/index.php?showtopic=111.
Netfront updated for Pocket PC, Mar. 31, 2005, http://jkontherun.com/2005/03/31/netfront_update/.
NetFront v. 3.2 for Series 60 User Manual, Apr. 20, 2005, http://www.access-company.com/downloads/NF_S60_files/NF32_S60_manual_PDF_200405.pdf.
Disable tabs in maxthon, Dec. 4, 2004, 5 pages.
Window Management—A Proposal, Jun. 20, 2004, 11 pages.
Changelog—Maxthon Browser, accessed Apr. 10, 2010, 40 pages.
Japanese Patent Office; "Decision of Rejection" issued in corresponding Japanese Application No. 2008-320158; dated Jun. 24, 2011; 7 pages (Includes English translation).
USPTO; Office Action issued in U.S. Appl. No. 11/380,890, mailed Sep. 24, 2009, 21 pages.
USPTO; Final Office Action issued in U.S. Appl. No. 11/380,890, mailed Apr. 13, 2010, 20 pages.
USPTO; Advisory Action issued in U.S. Appl. No. 11/380,890, mailed Jul. 20, 2010, 4 pages.
USPTO; Notice of Panel Decision from Pre-Appeal Brief Review issued in U.S. Appl. No. 11/380,890, mailed Sep. 16, 2010, 2 pages.
USPTO; Notice of Allowance issued in U.S. Appl. No. 11/380,890, mailed Nov. 22, 2010, 7 pages.
USPTO; Office Action issued in U.S. Appl. No. 11/380,890, mailed Jun. 23, 2011,18 pages.
USPTO; Final Office Action issued in U.S. Appl. No. 11/380,890, mailed Dec. 14, 2011, 27 pages.
USPTO; Advisory Action issued in U.S. Appl. No. 11/380,890, mailed Apr. 10, 2012, 3 pages.
Maxthon Tabbed Browser 1.2.00, Feb. 27, 2005, 5 pages.
Tab Browsing, Oct. 17, 2005, 6 pages.

* cited by examiner

FIG. 8

TAB STATUS TABLE

43A

| | CONTENT FLAG | NOT-YET-DISPLAYED/ DISPLAYED FLAG | LOCKING FLAG | SSL/NON-SSL FLAG | FINAL READ-IN COMPLETION TIME | CONTENT URL |
|---|---|---|---|---|---|---|
| TAB 1 | | | | | | |
| TAB 2 | | | | | | |
| TAB 3 | | | | | | |
| TAB 4 | | | | | | |

TAB-SWITCHING SETTING TABLE 43B

| AUTOMATIC/MANUAL | SELECTION CONDITIONS | | |
|---|---|---|---|
| | SSL FLAG | NOT-YET-DISPLAYED FLAG | LOCK FLAG |
| | | | |

FIG. 19

| TAB STATUS TABLE | | | | | | | | |
|---|---|---|---|---|---|---|---|---|
| | ACTIVE FLAG | CONTENT FLAG | READ-IN STATUS | | | COMPONENT NUMBER | READ COMPONENT NUMBER | READING FLAG | CONTENT URL |
| | | | MAIN DATA READ-IN COMPLETE | ANALYSIS COMPLETE | LAYOUT COMPLETE | | | | |
| TAB 1 | | | | | | | | | |
| TAB 2 | | | | | | | | | |
| TAB 3 | | | | | | | | | |
| TAB 4 | | | | | | | | | |

43A'

SYSTEM AND METHOD FOR CORRESPONDING TABS TO CONTENT INFORMATION

CROSS REFERENCE TO RELATED APPLICATION

This application is a continuation of U.S. patent application Ser. No. 11/380,890, filed Apr. 28, 2006, entitled "SYSTEM AND METHOD FOR CORRESPONDING TABS TO CONTENT INFORMATION", now abandoned, which claims foreign priority from Japanese Patent Application No. 2005-167568, filed on Jun. 7, 2005, the entire disclosures and contents of which are both hereby fully incorporated by reference herein in their entireties.

BACKGROUND OF THE INVENTION

1. Technical Field of the Invention

The present invention relates to technologies preferred to be used for a screen display program, a computer readable recording medium recorded with the screen display program, a screen display apparatus, a portable terminal apparatus, and a screen display method.

2. Discussion of the Related Art

Conventionally, a tab browser has been used in the screen display apparatus. Multiple tabs are provided in a window on the screen by the tab browser, and digital contents (hereafter referred to as contents) downloaded via the Internet are corresponded to these tabs. Changing display of the contents corresponded to the respective tabs allows a user to access multiple contents in a single window (Patent Document 1).

More specifically, consider a tab browser provided with four tabs T1 through T4, for example, displayed on the screen. In this case, when the tab T1 is selected as a displaying tab (hereafter referred to as an active tab) by the user, a content corresponded to the tab T1 becomes visible. The contents corresponded to the respective tabs T2 through T4 that are non-displaying tabs (hereafter referred to as inactive tabs) are maintained invisible. In other words, changing selection of the tabs T1 through T4, each being a displaying tab, causes the respective tabs T1 through T4 to change over to active or inactive.

[Patent Document 1] Japanese Patent Application Laid-open 2000-172398.

SUMMARY OF THE INVENTION

In some embodiments the present invention advantageously addresses the needs above as well as other needs by providing a computer-readable recording medium having recorded thereon a screen display program to be executed on a computer, said screen display program comprising: a reception instructing step to instruct reception of content information; a receiving step to receive the content information in conformity with the instruction of the reception instructing step; a tab display control step to display a plurality of tabs in a display screen; a correspondence setting step to correspond the content information received to one of the plurality of tabs; a drawing step to generate a content image by drawing the content information received and to store the content image; a content image display control step to display a content image of content information corresponding to an active tab selected from the plurality of tabs, in an area of the display screen other than display areas for the plurality of tabs; a progress information acquiring step to acquire a progress information for processing of at least one or more of receiving, drawing, and storing of predetermined content information for which reception is instructed, the progress information at least showing whether the processing is completed; and a progress status outputting step to display an image corresponding to the progress information acquired in the progress information acquiring step, the displayed image associated to a tab corresponded to the predetermined content information on the display screen.

Another embodiment of the present invention provides a computer for executing a screen display program recorded on a computer-readable recording medium, said screen display program comprising: a reception instructing step to instruct reception of content information; a receiving step to receive the content information in conformity with the instruction of the reception instructing step; a tab display control step to display a plurality of tabs in a display screen; a correspondence setting step to correspond the content information received to one of the plurality of tabs; a drawing step to generate a content image by drawing the content information received and to store the content image; a content image display control step to display a content image of content information corresponding to an active tab selected from the plurality of tabs, in an area of the display screen other than display areas for the plurality of tabs; a progress information acquiring step to acquire a progress information for processing of at least one or more of receiving, drawing, and storing of predetermined content information for which reception is instructed, the progress information at least showing whether the processing is completed; and a progress status outputting step to display an image corresponding to the progress information acquired in the progress information acquiring step, the displayed image associated to a tab corresponded to the predetermined content information on the display screen.

Another embodiment of the present invention provides a screen display apparatus comprising: a screen display program recorded on a computer-readable medium; reception instructing means for instructing reception of content information; receiving means for receiving content information in response to the instruction from the reception instructing means; tab display control means for displaying a plurality of tabs in a display screen; correspondence setting means for corresponding the content information received to any one of the plurality of tabs; image storage means; drawing means for generating a content image by drawing the content information received and for storing the content image in the image storage means; content image display control means for displaying a content image of content information corresponding to an active tab selected from the plurality of tabs, in an area of the display screen other than display areas for the plurality of tabs; progress information acquiring means for acquiring a progress information for processing of at least one or more of receiving, drawing, and storing of predetermined content information for which reception is instructed, the progress information at least showing whether the processing is completed; and progress status outputting means for displaying an image corresponding to the progress information acquired by the progress information acquiring means, the displayed image associated to a tab corresponded to the predetermined content information on the display screen.

Another embodiment of the present invention provides a screen display method comprising: reading a screen display program recorded on a computer-readable recording medium; instructing reception of content information; receiving content information in conformity with the instruction; displaying a plurality of tabs in a display screen; corresponding the received content information to any one of the plurality of tabs; generating a content image by drawing the received content information and storing the content image; displaying a content image of content information corresponding to an active tab selected from the plurality of tabs, in an area of the display screen other than display areas for the plurality of tabs; acquiring progress information for processing of at least one or more of receiving the predetermined content information, generating the content image, and storing the content image, the progress information at least showing whether the processing is completed; and displaying an image corresponding to the acquired progress information, the displayed image associated to a tab corresponded to the predetermined content information on the display.

Another embodiment of the present invention provides a computer-readable recording medium having recorded thereon a screen display program to be executed on a computer. The screen display program comprises: a receiving step to receive content information; a tab display control step to display a plurality of tabs in a display screen; a correspondence setting step to correspond the content information received in the receiving step to one of the plurality of tabs; and a content display control step to display content information corresponding to a displaying tab selected from the plurality of tabs in another area than display areas for the plurality of tabs; wherein in the correspondence setting step, when corresponding the content information to a non-displaying tab other than the displaying tab from among the plurality of tabs, it is determined whether or not there is a non-corresponded, non-displaying tab to which other content information is not corresponded, and when the non-corresponded, non-displaying tab does exist, the non-corresponded, non-displaying tab and the content information are corresponded, and when the non-corresponded, non-displaying tab does not exist, a non-displaying tab selected based on a predetermined selection condition and the content information are corresponded.

Another embodiment of the present invention provides a computer for executing a screen display program. The screen display program comprises: a receiving step to receive content information; a tab display control step to display a plurality of tabs in a display screen; a correspondence setting step to correspond the content information received in the receiving step to one of the plurality of tabs; and a content display control step to display content information corresponding to a displaying tab selected from the plurality of tabs in another area than display areas for the plurality of tabs; wherein in the correspondence setting step, when corresponding the content information to a non-displaying tab other than the displaying tab from among the plurality of tabs, it is determined whether or not there is a non-corresponded, non-displaying tab to which other content information is not corresponded, and when the non-corresponded, non-displaying tab does exist, the non-corresponded, non-displaying tab and the content information are corresponded, and when the non-corresponded, non-displaying tab does not exist, a non-displaying tab selected based on a predetermined selection condition and the content information are corresponded.

Another embodiment of the present invention provides a screen display apparatus comprising: receiving means for receiving content information; tab display control means for displaying a plurality of tabs in a display screen; correspondence setting means for corresponding the content received by the receiving means to any one of the plurality of tabs; and content image display control means for displaying content information corresponding to a displaying tab selected from the plurality of tabs, in an area of the display screen other than display areas for the plurality of tabs; wherein when corresponding the content information to a non-displaying tab other than the displaying tab from among the plurality of tabs, the correspondence setting means determines whether or not there is a non-corresponded, non-displaying tab to which the content information is not corresponded, and when the non-corresponded, non-displaying tab does exist, the non-corresponded, non-displaying tab and the content information are corresponded, and when the non-corresponded, non-displaying tab does not exist, a non-displaying tab selected based on a predetermined selection condition and the content information are corresponded.

Another embodiment of the present invention provides a screen display method comprising: receiving content information; displaying a plurality of tabs in a display screen; corresponding the received content information to any one of the plurality of tabs; and displaying content information corresponding to a displaying tab selected from the plurality of tabs, in an area of the display screen other than display areas for the plurality of tabs; wherein when corresponding the content information to a non-displaying tab other than the displaying tab from among the plurality of tabs, it is determined whether or not there is a non-corresponded, non-displaying tab to which the content information is not corresponded, and when the non-corresponded, non-displaying tab does exist, the non-corresponded, non-displaying tab and the content information are corresponded, and when the non-corresponded, non-displaying tab does not exist, a non-displaying tab selected based on a predetermined selection condition and the content information are corresponded.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 8 is a diagram showing an exemplary tab status table of this embodiment;

FIG. 19 is a diagram showing an exemplary tab status table of a second embodiment of the present invention;

DETAILED DESCRIPTION

Figure 1:
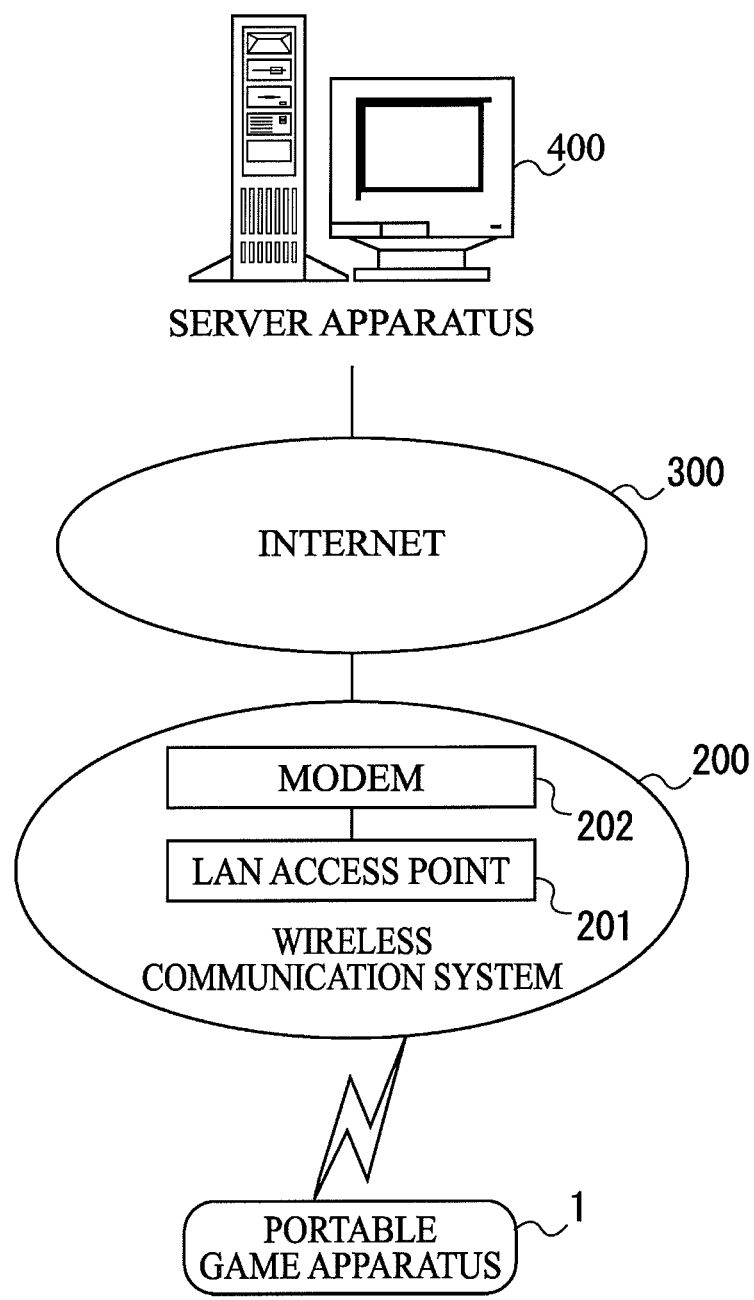
FIG. 1 is a block diagram showing a structure where a portable game apparatus and a server apparatus of a first embodiment of the present invention carry out communication.

Problem to Be Solved By the Invention

With such a tab browser, for example, a content for a currently active tab may be displayed, and contents other than the displayed content may be associated thereto. More specifically, the currently displayed content includes an item which is associated with a uniform resource locator (URL) indicating the stored location of another content using a hyperlink, and when this item is selected through the user's operation, a content may be downloaded based on the URL corresponded to this item and become visible on the screen.

In such a case, for example, assume that the user wants to access this content using another tab. The user must then carry out an operation to select another tab (tab T2, for example), enter the URL for a desired content at the tab T2, and carry out an operation to display the content. Such operations are tedious for the user.

Furthermore, after having carried out the operation to display the desired content at the selected tab T2, the user may activate the tab T1, for example, and view a content corresponded to the tab T1 while waiting for the desired content to become displayable on the screen. In such a case, the tab T2 becomes inactive, and the user becomes uncertain of when the content corresponded to the tab T2 will be displayable. This is inconvenient for the user.

Therefore, the present invention is created with consideration for the above-described problems and aims to provide screen displaying technology allowing improvement in operability for the user and user-friendliness.

Means of Solving the Problem

According to a first aspect of the present invention, content information is received, a plurality of tabs are displayed in a display screen, the received content information is corresponded to any one of the plurality of tabs, and the content information corresponding to a displaying tab selected from the plurality of tabs is displayed in an area other than display areas for the plurality of tabs. When corresponding the content information to a non-displaying tab other than the displaying tab from among the plurality of tabs, it is determined whether or not there is a non-corresponded, non-displaying tab to which the content information is not corresponded, and when the non-corresponded, non-displaying tab does exist, the non-corresponded, non-displaying tab and the content information are corresponded, and when the non-corresponded, non-displaying tab does not exist, a non-displaying tab selected based on a predetermined selection condition and the content information are corresponded.

Furthermore, according to a second aspect of the present invention, reception of content information is instructed, the content information is received in conformity with the instruction, a plurality of tabs are displayed in a display screen, and the received content information is corresponded to one of the plurality of tabs. A content image is generated by drawing the received content information, the content image is stored in an image storage means, and a content image of content information corresponding to a displaying tab selected from the plurality of tabs is then displayed in an area of the display screen other than display areas for the plurality of tabs. Furthermore, a progress status for processing of at least one or more of receiving and drawing and storing is calculated for predetermined content information for which reception is instructed, and the calculated progress status is associated with a tab corresponded to the predetermined content information and is output.

Effects of Invention

According to the present invention, screen displaying technology allowing improvement in operability for the user and user-friendliness may be provided.

BEST MODE FOR CARRYING OUT THE INVENTION

Embodiments according to the present invention are described below with reference to the accompanying drawings. Note that like parts are designated by like symbols in the drawings. In addition, the embodiments merely show aspects of the present invention, and may be arbitrarily modified within the scope of the present invention.

First Embodiment (1) Structure
<Structure of Wireless Communication System>

FIG. 1 is a block diagram showing a structure where a portable game apparatus 1 and a server apparatus 400 according to this embodiment carry out communication.

A wireless communication system 200 is a communication system providing packet communication service to the portable game apparatus 1 connected to the wireless communication system 200. The wireless communication system 200 has a LAN access point 201 and a modem 202. The portable game apparatus 1 is capable of wireless communication with the LAN access point 201 via a wireless LAN such as IEEE802.11b when in a wireless area covered by the LAN access point 201. The modem 202 intermediates transfer and reception of data between the wireless communication system 200 and the Internet 300.

The portable game apparatus 1 and the server apparatus 400 respectively carry out communication in accordance with transmission control protocol/internet protocol (TCP/IP) communication via the Internet and the wireless communication system 200.

<Structure of Portable Game Apparatus>

Figure 2:
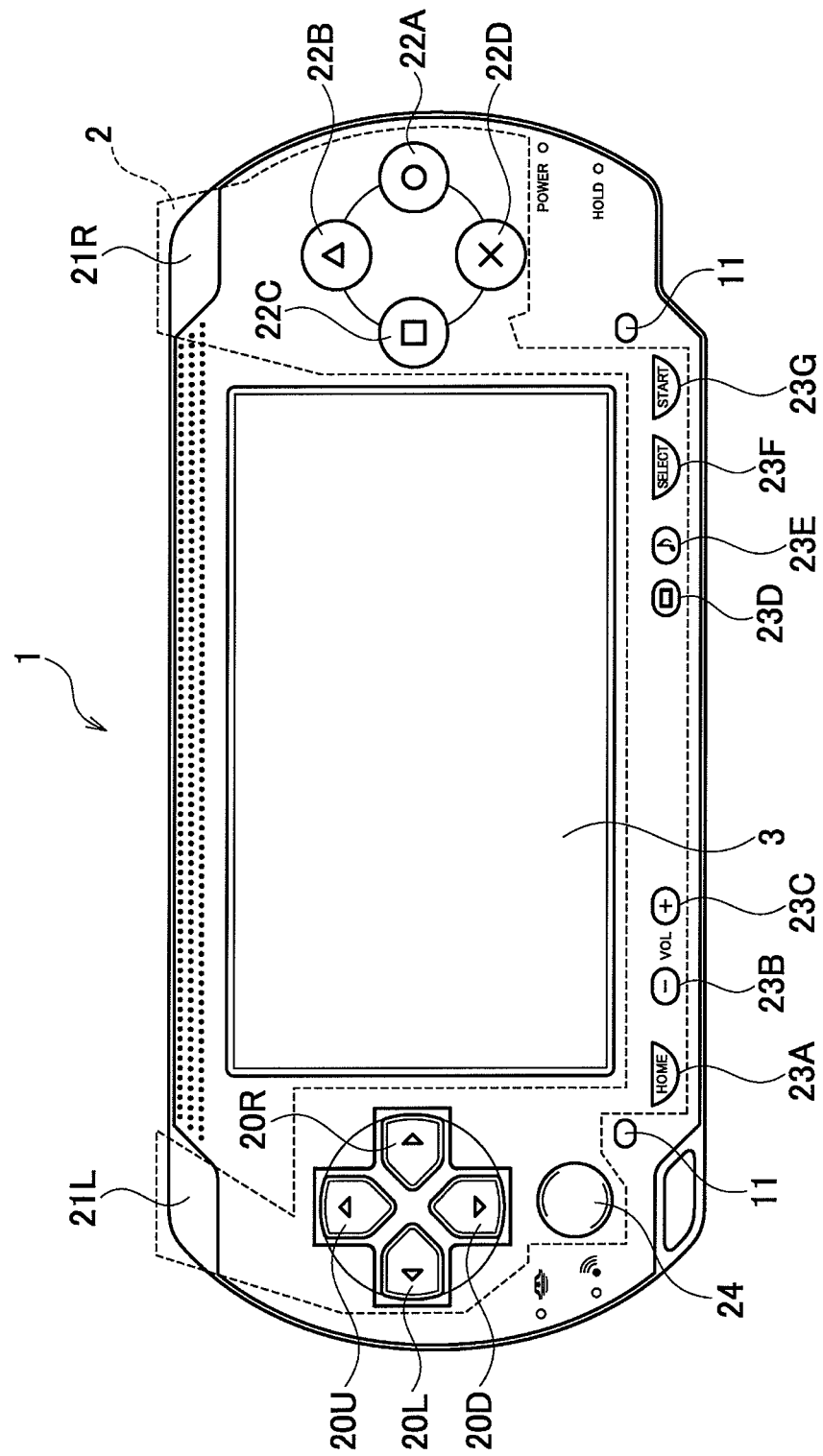
FIG. 2 is a diagram showing the front of the main body of the portable game apparatus of this embodiment.
Figure 3:
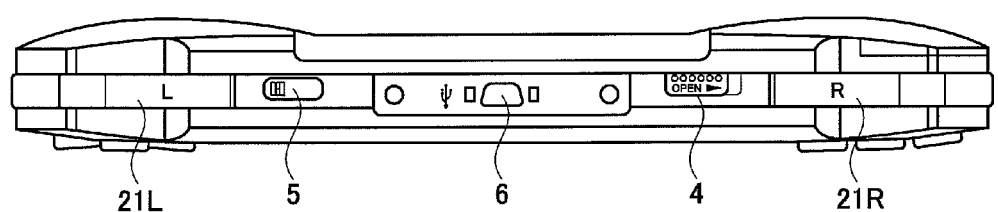
FIG. 3 is a diagram showing the top of the main body of the portable game apparatus of this embodiment.
Figure 4:
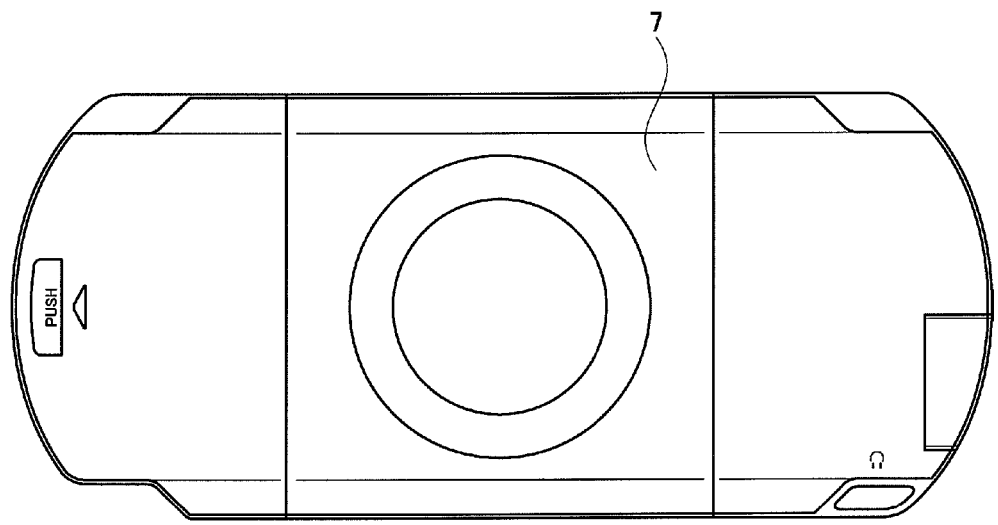
FIG. 4 is a diagram showing the back of the main body of the portable game apparatus of this embodiment.
Figure 5:
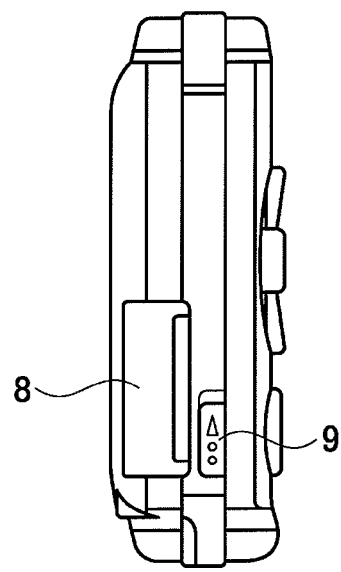
FIG. 5 is a diagram showing the left side of the main body of the portable game apparatus of this embodiment.
Figure 6:
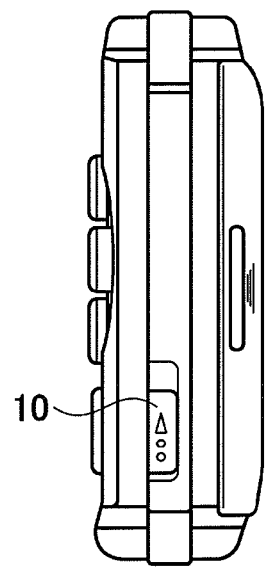
FIG. 6 is a diagram showing the right side of the main body of the portable game apparatus of this embodiment.

Next, a hardware structure of the portable game apparatus 1 is described while referencing FIGS. 2 through 6. FIGS. 2 through 6 show the outside of the portable game apparatus 1 according to an embodiment of the present invention. More specifically, FIG. 2 shows the front of the main body of the portable game apparatus 1, FIG. 3 shows the upper part thereof, FIG. 4 shows the back thereof, FIG. 5 shows the left side thereof, and FIG. 6 shows the right side thereof.

As shown in FIG. 2, the portable game apparatus 1 includes an operation input unit 2, which is enclosed by a dotted line, a display unit 3, and speakers 11.

The operation input unit 2 has the following operating parts: direction keys 20L, 20R, 20U, and 20D, an L button 21L, an R button 21R, a circle marked button 22A, a triangle marked button 22B, a square marked button 22C, a cross marked button 22D, a home button 23A, volume buttons 23B and 23C, a display button 23D, a sound button 23E, a select button 23F, a start button 23G, and an analog pad 24 through which performing analog operation is possible.

Note that the respective L button 21L and the R button 21R are provided on the left and right ends of the front to the top of the main body, as shown in FIG. 3.

The portable game apparatus 1 further includes a disk operating switch 4 for loading an optical disk, an infrared port 5 for carrying out wireless communication, and a USB terminal 6.

The portable game apparatus 1 even further includes on the central part of the back of the main body a disk loader 7 on which an optical disk is mounted, as shown in FIG. 4. An optical disk recorded with an application program such as a video game or the like is mounted on this disk loader 7.

The portable game apparatus 1 includes a memory card slot 8 in which a memory card is inserted and a wireless LAN switch 9, as shown in FIG. 5, and also includes a power switch 10 on the right side of the main body, as shown in FIG. 6. The portable game apparatus 1 further includes a headphone/microphone terminal and a charging terminal not shown in the drawings.

Figure 7:
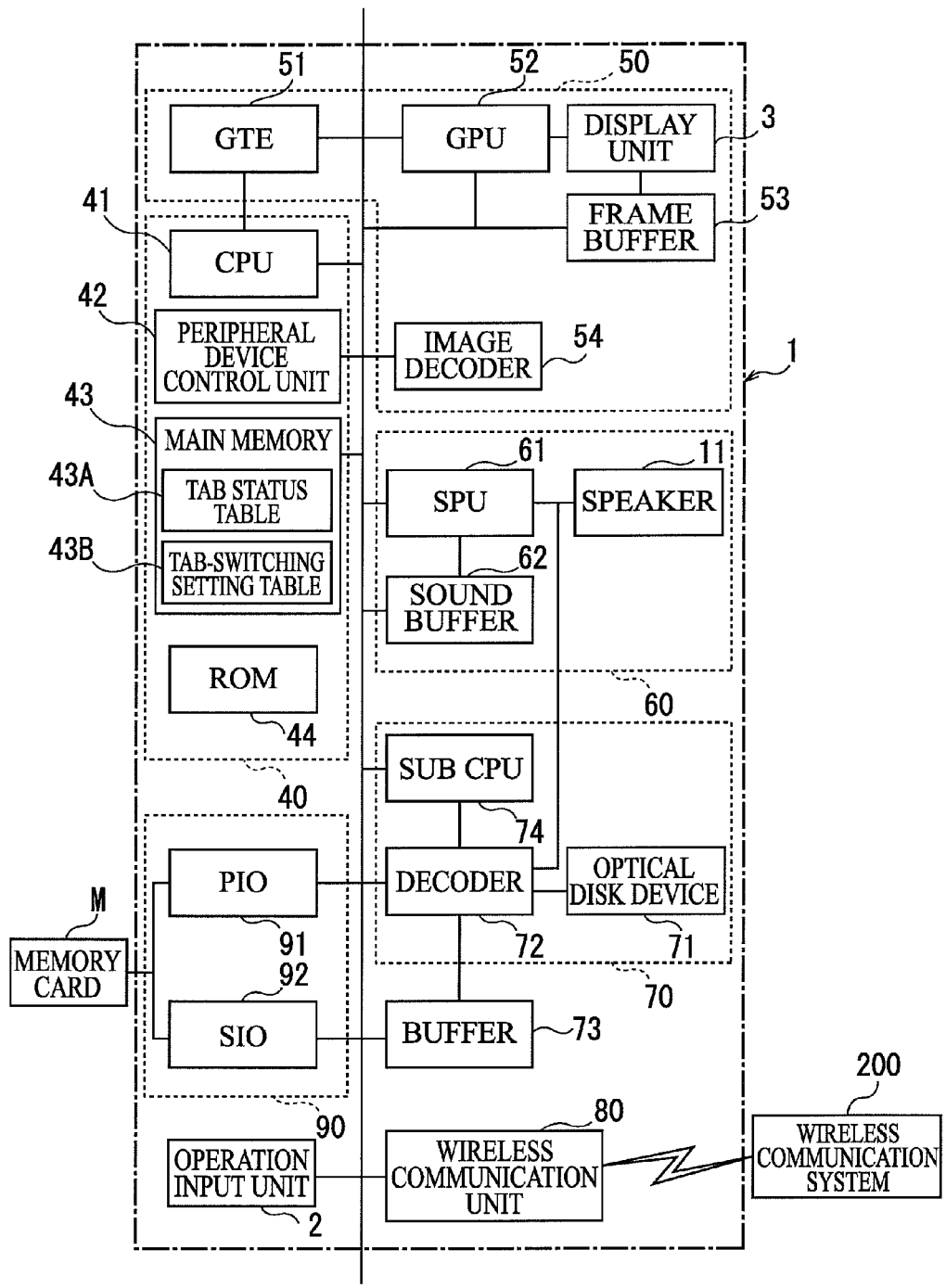
FIG. 7 is a block diagram schematically showing an exemplary electrical structure of the main parts of the portable game apparatus of this embodiment.

Next, an electrical structure of the portable game apparatus 1 is described while referencing FIG. 7. FIG. 7 is a block diagram schematically showing an exemplary electrical structure of the main part of the portable game apparatus 1.

The portable game apparatus 1 is constituted by a control system 40 made up of a central processing unit (CPU) 41 and its peripheral devices, a graphics system 50 made up of a graphic processing unit (GPU) 52 for drawing images onto a frame buffer 53 or the like, a sound system 60 made up of a sound processing unit (SPU) 61 for generating musical sounds, sound effects and the like, an optical disk control unit 70 for controlling an optical disk recorded with an application program, a wireless communication unit 80, an interface unit 90, the operation input unit 2, and buses connecting the above-given respective units.

The sound system 60, which is controlled by the control system 40, includes the SPU 61 configured to generate musical sounds, sound effects and the like, a sound buffer 62 recorded with waveform data and the like by this SPU 61, and the speakers 11 configured to output the musical sounds, sound effects and the like generated by the SPU 61.

The SPU 61 includes an adaptive differential PCM (ADPCM) decoding function to reproduce voice data resulting from being subjected to ADPCM using, for example, 16-bit voice data as 4-bit differential signals, a regenerating function to reproduce sound effects and the like by regenerating the waveform data stored in the sound buffer 62, a modulating function to modulate and reproduce the waveform data stored in the sound buffer 62, and the like.

The optical disk control unit 70 includes an optical disk device 71 configured to reproduce a program or data recorded on an optical disk, a decoder 72 configured to decode a recorded program or data plus an error correction code (ECC), for example, and a buffer 73 configured to temporarily store data from the optical disk device 71 so as to speed up reading data from the optical disk. A sub-CPU 74 is connected to the decoder 72.

The interface unit 90 includes a parallel I/O interface (PIO) 91 and a serial I/O interface (SIO) 92. These are interfaces for connecting a memory card M to the portable game apparatus 1.

The operation input unit 2 supplies to the CPU 41 with an operation signal generated through manipulation of the operating parts.

The wireless communication unit 80 carries out wireless communication with the wireless communication system 200 via the infrared port 5. This wireless communication unit 80 transmits data to the wireless communication system 200 and receives data transmitted from the wireless communication system 200 under the control of the control system 40.

The graphics system 50 includes a geometry transfer engine (GTE) 51, the GPU 52, the frame buffer 53, an image decoder 54, and the display unit 3.

The GTE 51 is operable to execute multiple parallel calculations, for example, and carry out coordinate transformation, light source-based calculation, and calculations of matrices, vectors, and the like at high speed. The control system 40 defines a three-dimensional model as a combination of basic polygons such as triangles or quadrangles based on calculation results from the GTE 51, and then sends the GPU 52 a draw instruction corresponding to each polygon for drawing a three-dimensional image.

The GPU 52 draws polygons or the like in the frame buffer 53 in conformity with the draw instruction from the control system 40. Furthermore, the GPU 52 may carry out flat shading, Gouraud shading for determining the color within a polygon by complementing the colors of respective polygon apexes, and texture mapping for attaching to a polygon a texture stored in a texture area of the frame buffer described later.

The frame buffer 53 is stored with the images drawn by the GPU 52. This frame buffer 53 is constituted by so-called dual port RAM allowing simultaneous processing: drawing from the GPU 52, transferring from the main memory 43, and reading out for displaying. Furthermore, aside from a display area for video output, a color look-up table (CLUT) area stored with a CLUT referenced when the GPU 52 draws a polygon or the like, and the texture area stored with material (texture) inserted (mapped) in the polygon or the like, which has been transformed into coordinates and drawn by the GPU 52, are provided in the frame buffer 53. The CLUT area and the texture area are dynamically modified in response to modification of the display area.

Content drawing areas corresponding to respective tabs are further provided in the frame buffer 53.

Note that with this embodiment, the number of tabs is preset to 4, where each tab is corresponded to a tab ID having a value 1 through 4. In the following description, the tab with a tab ID '1' is called tab 1, the tab with a tab ID '2' is called tab 2, the tab with a tab ID '3' is called tab 3, and the tab with a tab ID '4' is called tab 4.

In the frame buffer 53, textures for the respective contents corresponded to the respective tabs are mapped by the GPU 52 onto the respective content drawing areas provided to the respective tabs. As a result, images represented by the respective contents (hereafter referred to as content images) are drawn in the frame buffer 53.

The display unit 3 displays the images stored in the frame buffer 53 under the control of the control system 40.

The image decoder 54 decodes static image or animated image data, which is stored in the main memory 43 and compressed and encoded through orthogonal transformation such as discrete cosine transformation, and then stores it in the main memory 43 under the control of the CPU 41.

The control system 40 includes the CPU 41, a peripheral device control unit 42, which controls interrupts and direct memory access (DMA) transfer, the main memory 43, which is random access memory (RAM), and read only memory (ROM) 44.

The ROM 44 is stored with a program such as an operating system or the like for controlling each part of the portable game apparatus 1. The CPU 41 controls the entire portable game apparatus 1 by reading out the operating system from the ROM 44 to the main memory 43 and executing the read-out operating system.

Furthermore, the ROM 44 is stored with a program for causing the CPU 41 to select a tab to be corresponded to a desired content by accessing a tab status table 43A and a tab-switching setting table 43B, which are described later, a program for causing the CPU 41 to allow the user to decide settings related to the tab selection, a program for causing the CPU 41 to carry out display control for tabs, and programs such as a tab browser.

The tab status table 43A and the tab-switching setting table 43B are stored in the main memory 43.

The tab status table 43A shows statuses of the respective tabs, and as shown in FIG. 8, is stored with a content flag, an not-yet-display/displayed flag, a locking flag, a secure socket layer (SSL)/non-SSL flag, a final read-in compilation time, and a content URL for each tab.

The content flag is a flag indicating whether or not there is a content corresponded to that tab, where a value of '1' indicates there is a content, and a value of '0' indicates there is no content. Note that '0' is the initial value of the content flag and can be rewritten as '1' when the CPU 41 is corresponding a content to the tab.

The not-yet-displayed/displayed flag is a flag indicating whether or not a content image representing the content corresponded to that tab has been displayed on the display unit 3, where a value of '1' indicates that it has been displayed on the display unit 3, and a value of '0' indicates that it has not been displayed thereon. Note that '0' is the initial value of the not-yet-displayed/displayed flag and can be rewritten as '1' when the CPU 41 first displays on the display unit 3 a content image representing the content corresponded to the tab, and in the case of an instruction to display another new content image for this tab, the value of the not-yet-displayed/displayed flag for this tab is initialized as '0'.

The SSL/non-SSL flag is a flag indicating whether or not the content corresponded to the tab is an SSL-based content, where a value of '1' indicates it is based on the SSL, and a value of '0' indicates it is not based on the SSL. Note that the SSL is a protocol to encode and then transmit/receive data, and with this embodiment, contents transmitted/received in accordance to this SSL are called SSL-based contents.

Note that the not-yet-displayed/displayed flag and the SSL/non-SSL flag are respectively '0' for a tab without a corresponded content, namely a tab with a content flag '0'.

The locking flag is a flag indicating whether or not a tab for displaying a content image may be automatically selected when there is an instruction to display the content image at an inactive tab, where a value of '1' indicates selection is possible, and a value of '0' indicates selection is not possible.

Note that in the descriptions hereafter, displaying a content image at a currently inactive tab is expressed as displaying the content image at another tab. In addition, a tab that cannot be automatically selected as a tab to display a content image is expressed as locked or being locked.

The value of this locking flag is set by the user entering a setting for whether or not respective tabs are to be locked via the operation input unit 2. The initial value is '0'.

The final read-in completion time is a time when reception of a content corresponded to a tab is completed.

When there is a content corresponded to the tab, a URL indicating the stored location of the content is written in the content URL. When there is no content corresponded to the tab, the content URL is null.

Figures 9, 10:
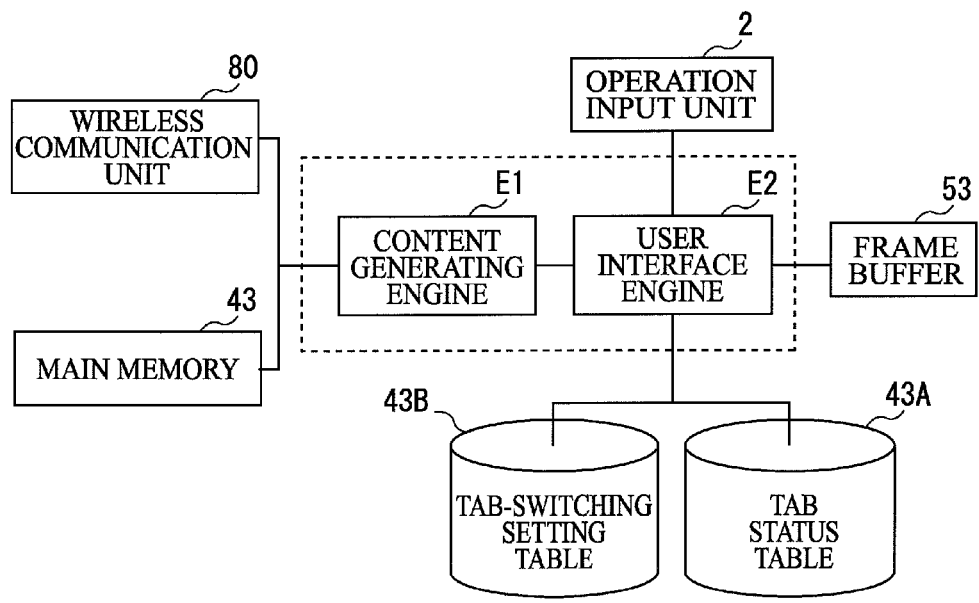
FIG. 9 is a diagram showing an exemplary tab-switching setting table of this embodiment.
FIG. 10 is a block diagram describing a functional structure of the portable game apparatus of this embodiment.

The tab-switching setting table 43B shows conditions for tab selection, and as shown in FIG. 9, stores an automatic/manual flag, an SSL flag, an not-yet-displayed flag, and a lock flag.

The automatic/manual flag is a flag indicating the select mode when there is an instruction to display the content image at another tab. More specifically, a mode where the value of the automatic/manual flag is '1' indicates automatic selection of a tab to display the content image. A mode where the value of the automatic/manual flag is '2' indicates to instruct the user to select a tab to display the content image. A mode where the value of the automatic/manual flag is '3' indicates to instruct the user to select a tab to display the content image when it could not be automatically selected.

The SSL flag is a flag indicating whether or not a tab corresponded with an SSL-based content is selectable when there is an instruction to display the content image at another tab. An SSL flag value of '0' indicates that selection is possible, and a value of '1' indicates that selection is not possible. The not-yet-displayed flag is a flag indicating whether or not a tab corresponded with an not-yet-displayed content is selectable when there is an instruction to display the content image at another tab. An not-yet-displayed flag value of '0' indicates that selection is possible, and a value of '1' indicates that selection is not possible.

The lock flag is a flag indicating whether or not a locked tab is selectable when there is an instruction to display a content image at another tab, where a value of '0' indicates selection is possible, and a value of '1' indicates selection is not possible.

Figure 13:
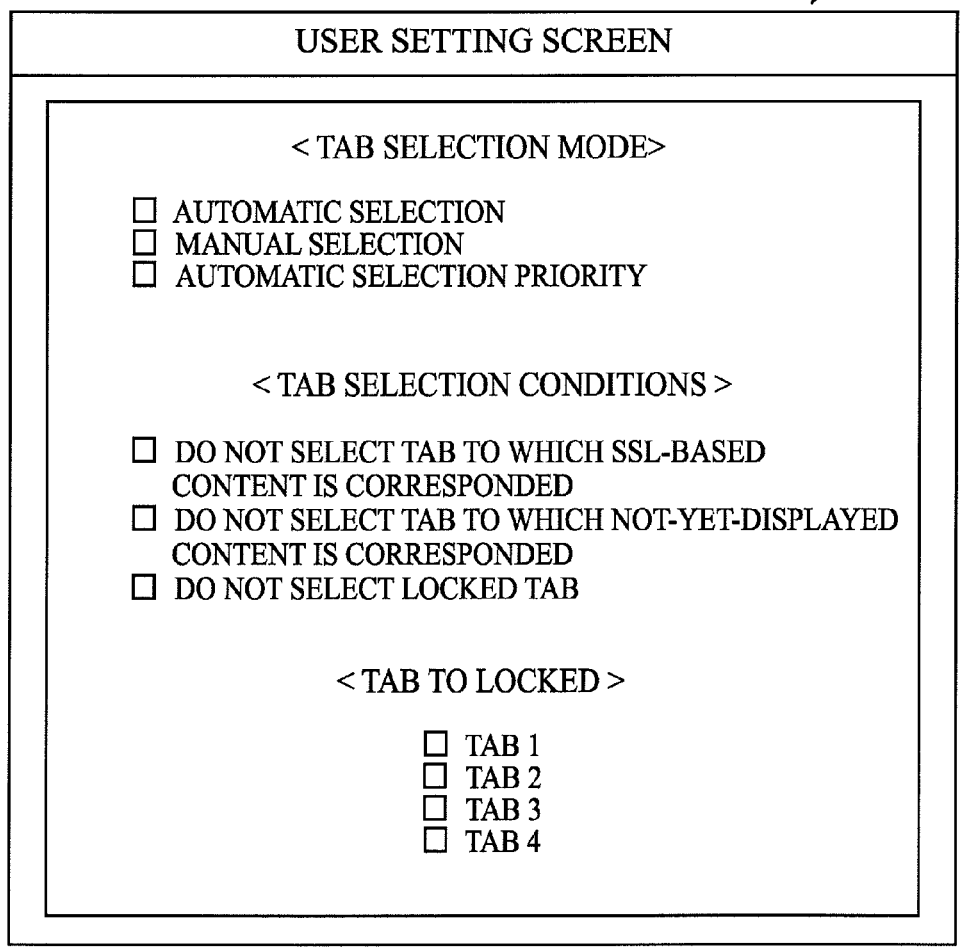
FIG. 13 shows an exemplary screen displayed on the display of this embodiment.

Note that the initial value of the respective flags is '1' and may be set and changed by the user on the setup screen as shown in FIG. 13. The operation of setting and changing is described in detail later in the operation section.

<Functional Structure>

Next, functions according to this embodiment implemented in the portable game apparatus 1 by the CPU 41 executing various programs are described. FIG. 10 is a block diagram describing a functional structure of the portable game apparatus 1. The portable game apparatus 1 has a content generating engine E1 and a user interface engine E2. The entities of these engines are programs executed by the CPU 41 or the like. Various kinds of processing are carried out by respective parts of the portable game apparatus 1, such as the GPU 52, in response to control commands for the CPU 41 during the execution processes of these programs, thereby implementing the functions of these engines.

Figure 11:
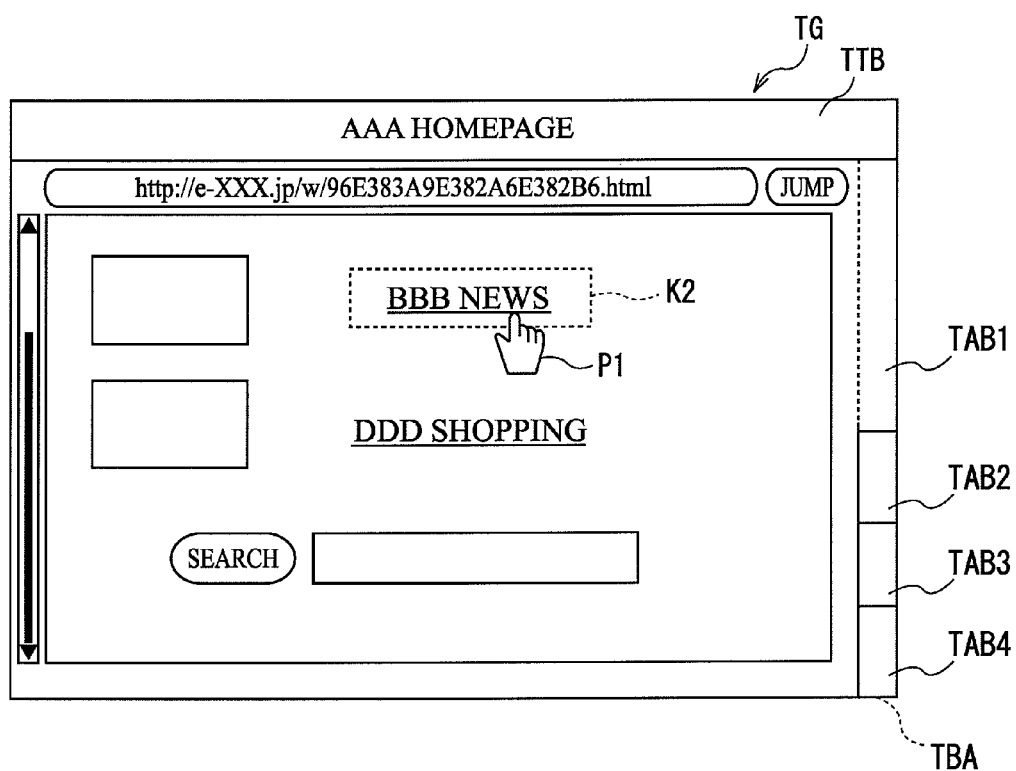
FIG. 11 shows an exemplary screen displayed on a display of this embodiment.

Note that the CPU 41 reads out a program from the ROM 44 to the main memory 43 and executes it, thereby displaying a tab browser screen TG as shown in FIG. 11 on the display unit 3. In this tab browser screen TG, a tab bar display area TBA is provided on the right end of the screen, where four tab bars TAB1 through 4 corresponding to the tabs 1 through 4 are displayed in this tab bar display area TBA. Furthermore, a title bar TTB is displayed on the upper portion of the screen, where a content title name is displayed in the display area of this title bar TTB.

When one of the tab bars TAB1 through 4 is selected by the user via the operation input unit 2, the CPU 41 detects a signal for that operation, reads out the content image of a content correspond to the selected tab bar from a content image area for that tab in the frame buffer 53, and then displaying it on the display unit 3.

In the case where the circle marked button 22A is pressed for a predetermined duration or longer during a user's operation for instructing to display a desired content image, the interface engine E2 detects this operation and judges that an instruction to display the content image at another tab has been given. More specifically, for example, in the case where a screen with the active tab 1 as shown in FIG. 11 is displayed on the display unit 3, an item K2 in this screen is associated to the URL of a content via a hyperlink. In the case, when the user positions a pointer P1 at the item K2 via the operation input unit 2 and presses the circle marked button 22A for a predetermined duration or longer, the interface engine E2 detects this operation and judges that an instruction to display the content image at a tab other than the tab 1 has been given. The user moving the position of the pointer P1 and control involved therein are described later. The user interface engine E2 then carries out an instruction to download from the server apparatus 400 the contents associated to the URL for the content generating engine E1. Note that in the case where the user interface engine E2 has detected that the circle marked button 22A is pressed for less than or equal to a predetermined duration during an operation where the user instructs to display a desired content image, it detects that an instruction to display the content image at an active tab (tab 1 in FIG. 11) has been given.

The content generating engine E1 then requests the server apparatus 400 for transmission of the content via the wireless transmission unit 80 in response to an instruction from the user interface engine E2. The content generating engine E1 receives the content from the server apparatus 400 via the wireless communication unit 80, analyzes the content, generates a texture for the content based on the analysis results, and then sends the texture to the user interface engine E2.

The user interface engine E2 selects a tab to be corresponded to the content related to the texture sent from the content generating engine E1 by accessing the tab status table 43A and the tab-switching setting table 43B, and then corresponds the selected tab and the content. Then, the user interface engine E2 carries out an instruction for the GPU 52 to draw the texture in a content drawing area for the tab in the frame buffer 53. As a result, the texture for the content corresponded to the selected tab is mapped onto the frame buffer 53.

Furthermore, once the selected tab and the content are corresponded, the user interface engine E2 updates the respective values of the content flag, the not-yet-displayed/displayed flag, the SSL/non-SSL flag, the final read-in compilation time, and the content URL for the tab in the tab status table 43A.

The CPU 41 reads from the frame buffer 53 the content image of the content corresponded to the tab with an active flag '1', which is one of the content images of the contents corresponded to respective tabs by the content generating engine E1 and the user interface engine E2 and then displays it on the display unit 3, thereby displaying the content image of the content corresponded to that tab on the display unit 3. Note that only the tab bar of the tab is displayed at the tab with an active flag "0".

<Display Control for Tabs>

In this embodiment, basic colors displayed on the tab bars for the respective tabs are preset. In addition, the CPU 41 determines the colors displayed on the tab bars for the respective tabs in accordance to statuses of the respective tabs in the tab status table. More specifically, the basic colors preset for the respective tabs are red for the tab 1, blue for the tab 2, yellow for the tab 3, and green for the tab 4. The CPU 41 determines the tint of each color according to the active flag for every tab, and then determines whether or not to add a fog effect (color effect as if misty) to the respective colors of the respective tabs. More specifically, the CPU 41 sets a dark red (crimson) to be displayed on the tab bar for the tab 1 in the case where the active flag corresponding to the tab 1 is '1' and the content flag corresponding to the tab 1 is '1', and sets a misty crimson in the case where the active flag corresponding to the tab 1 is '1' and the content flag corresponding to the tab 1 is '0'. Otherwise, the CPU 41 sets a light red (pink) to be displayed in the case where the active flag corresponding to the tab 1 is '0' and the content flag corresponding to the tab 1 is '1', and sets a misty pink in the case where the active flag corresponding to the tab 1 is '0' and the content flag corresponding to the tab 1 is '0'.

The same holds for the tabs 2 through 4, where the CPU 41 sets a dark color as the basic color to be displayed on the tab bar of the tab when the active flag is '1' and the content flag is '1', and adds the fog effect to that dark color when the active flag is '1' and the content flag is '0'. It sets a light color as the basic color to be displayed on the tab bar of the tab when the active flag is '0' and the content flag is '1', and adds the fog effect to that light color when the active flag is '0' and the content flag is '0'.

Note that instead of changing the tint of a color using the fog effect, the tint of each color may be changed by differing alpha values of the respective colors corresponding to the respective tabs in conformity with the active flags thereof.

Furthermore, the CPU 41 determines lengths of the tab bars in conformity with the values of the active flags in the tab status table 44A. More specifically, for the tab with an active flag '1', the length of that tab bar is made to be half the length of the entire tab bar display area TBA, and for the tab with an active flag '0', the length of that tab bar is made to be a sixth of the length of the entire tab bar display area TBA.

The CPU 41 then gives the GPU 52 a draw command based on the colors and the lengths of the tab bars for the respective tabs determined in the above manner. The GPU 52 draws in the frame buffer 53 in response to the draw command from the CPU 41, and then the CPU 41 displays on the display unit 3 the image drawn in the frame buffer 53, and the tab bars for the respective tabs are thus displayed on the display unit 3 with the colors and the lengths determined by the CPU 41.

Such display control for the tabs allows the user to easily visually identify which tab is active or not, whether a content is corresponded to the tab, and the like.

<Control for Manipulations by User>

With this embodiment, the user controls switching to an active tab by pressing the L button 21L or the R button 21R. More specifically, when the user presses the L button 21L once, the CPU detects a signal for that manipulation, activates the tab having a tab ID which is greater than that of the currently active tab by one, and activates the tab with a tab ID 1 (tab 1) when the tab ID of the currently active tab is 4. Furthermore, when the user presses the R button 21R once, the CPU detects a signal for that manipulation, activates the tab having a tab ID which is smaller than that of the currently active tab by one, and activates the tab with a tab ID 4 (tab 4) when the tab ID of the currently active tab is 1. Note that the CPU 41 writes a '1' in the active flag of the tab status table for each tab activated through the control described above, and also writes a '0' in the active flags for all the remaining tabs.

In addition, in response to the user's manipulation of the direction keys 20L, 20R, 20U, or 20D in the portable game apparatus 1, the CPU 41 controls so that the pointer (P1 in FIG. 11) can be moved and displayed up, down, right and left in the screen displayed on the display unit 3. Furthermore, this manipulation also causes to scroll the screen. Moreover, in response to the user's manipulation of the analog pad 24, the CPU 41 controls so that the pointer can be moved and displayed up, down, right and left in the screen displayed on the display unit 3. Note that the CPU 41 does not scroll the screen in response to the user's manipulation of the analog pad 24, but it controls so that the screen can be scrolled in response to the user's simultaneous manipulation of the square marked button 22C and the direction key 20L, 20R, 20U or 20D.

<Structure of Server Apparatus>

Figure 12:
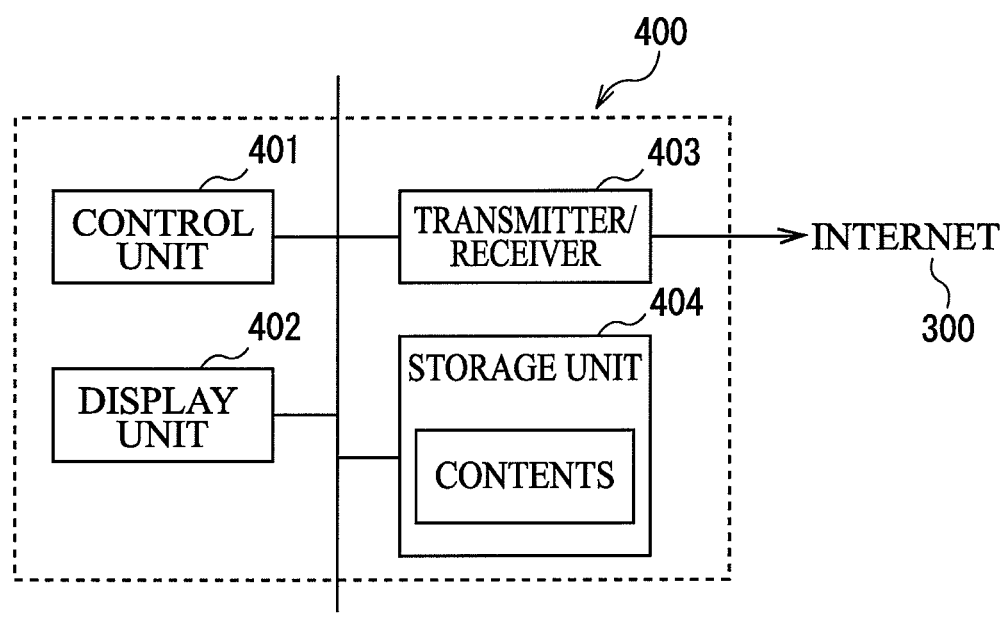
FIG. 12 is a block diagram schematically showing an exemplary electrical structure of the main parts of the server apparatus of this embodiment.

Next, a structure of the server apparatus 400 is described while referencing FIG. 12. FIG. 12 is a block diagram schematically showing an exemplary electrical structure of the main parts of the server apparatus 400.

The server apparatus 400 includes a control unit 401, a display unit 402, a transmitter/receiver 403, and a storage unit 404. The control unit 401 is made up of a central processing unit (CPU), RAM, ROM (not shown in the drawing) and the like, and controls each part constituting the server apparatus 400.

The storage unit 404 is constituted by a hard disk or the like and is stored with various programs and contents. The transmitter/receiver 403 receives data transmitted via the Internet and supplies it to the control unit 401, and transmits the data supplied from the control unit 401 via the Internet.

Upon reception of a request message requesting a content from the portable game apparatus 1 via the transmitter/receiver 403, the control unit 401 reads out the content from the storage unit 404, generates a response message including the content, and transmits it to the portable game apparatus 1 via the transmitter/receiver 403.

(2) Operations

Next, operations according to this embodiment are described.

Note that a power supply not shown in the drawing of the server apparatus 400 is turned on, programs such as an operation system stored in the ROM of the control unit 401 are executed by the CPU of the control unit 401, and instructions are entered by the user, thereby executing various programs stored in the storage unit 404 and implementing the functions described in the above structure section. Similarly, a power supply not shown in the drawing of the portable game apparatus 1 is turned on, programs such as an operation system stored in the ROM 44 are read out to the main memory 43 and executed by the CPU 41, and the respective instructions are entered by the user, thereby executing the various programs read out from the ROM 44 to the main memory 43 and the functions described in the above structure section are implemented.

<User Setting Operation>

In response to the user's instruction to display the setting screen of the tab browser by manipulating the operation input unit 2 of the portable game apparatus 1, the CPU 41 displays the setting screen SG on the display unit 3 as shown in FIG. 13. In this screen, the user may set a tab selection mode, a tab selection condition, and a tab he/she wants to lock when displaying a content image at another tab. 'Automatic selection', 'manual selection' or 'automatic selection priority' may be set for the tab selection mode. In response to the user's selection of a mode by manipulating the operation input unit 2 to enter a check in a check box displayed to the left of the desired mode, the CPU 41 detects a signal for this manipulation and rewrites the value of the automatic/manual flag in the tab-switching setting table 43B to the value corresponding to the mode to which the check is entered. More specifically, the value of the automatic/manual flag in the tab-switching setting table 43B is set to '1' in the case where 'automatic selection' has been selected by the user, it is set to '2' in the case where 'manual selection' has been selected by the user, and it is set to '3' in the case where 'automatic selection priority' has been selected by the user.

Note that the initial setting for the selection mode is 'automatic selection', and the initial value of the automatic/manual flag in the tab-switching setting table 43B is '1'. Therefore, the user does not have to carry out setting in the setting screen SG when 'automatic selection' is desired as the selection mode.

Furthermore, in the case of canceling the selection instruction, in response to the user's manipulation of the operation input unit 2 to cancel a check in a check box displayed to the left of the selection mode desired to be cancel, the CPU 41 detects a signal for this manipulation, displays a check in the checkbox displayed to the left of 'automatic selection', and rewrites the value of the automatic/manual flag in the tab-switching setting table 43B to the initial value '1'.

At least one of selection conditions: 'do not select a tab to which an SSL-based content is corresponded', 'do not select a tab to which an not-yet-displayed content is corresponded' and 'do not select a locked tab' may be set. In response to the user's manipulation of the operation input unit 2 to enter a check in a check box displayed to the left of the desired selection condition, the CPU 41 detects a signal for this manipulation and rewrites the value of the automatic/manual flag in the tab-switching setting table 43B to '1'. In the case where the condition 'do not select a tab to which an SSL-based content is corresponded' is selected, the value of the SSL flag is rewritten as '1'. In the case where the condition 'do not select a tab to which an not-yet-displayed content is corresponded' is selected, the value of the not-yet-displayed flag is rewritten as '1'. In the case where the condition 'do not select a locked tab' is selected, the value of the lock flag is rewritten as '1'. Note that the initial setting for the selection condition targets tabs to which respective SSL-based contents are corresponded, tabs to which respective not-yet-displayed contents are corresponded, and locked tabs, and the initial values for the SSL flag, the non-display flag, and the lock flag in the tab-switching setting table 43B are all '0'. Therefore, the user does not have to carry out setting in the setting screen SG when the above selection conditions are not desired.

Otherwise, in response to the user's manipulation of the operation input unit 2 to cancel the check in the check box displayed to the left of the selection condition desired to be canceled, the CPU 41 detects a signal for this manipulation and rewrites the value of the flag in the tab-switching setting table 43B corresponding to the selected item to '0'.

In addition, when there is a tab desired to be locked, the user may lock at least one of the tabs 1 through 4. In response to the user's manipulation of the operation input unit 2 to enter a check in a check box displayed to the left of the tab to be locked, the CPU 41 detects a signal for this manipulation and rewrites the value of the locking flag in the tab status table 43A corresponding to the selected tab to '1'. Note that all the tabs are unlocked in the initial setting state, and locking flags corresponding to all of the tabs in the tab status table 43A are '0'. Therefore, the user does not have to carry out setting in this setting screen SG when locking a tab is not desired.

The user may set selection conditions for the tabs in this manner.

<Tab Selection Operation>

Figure 14:
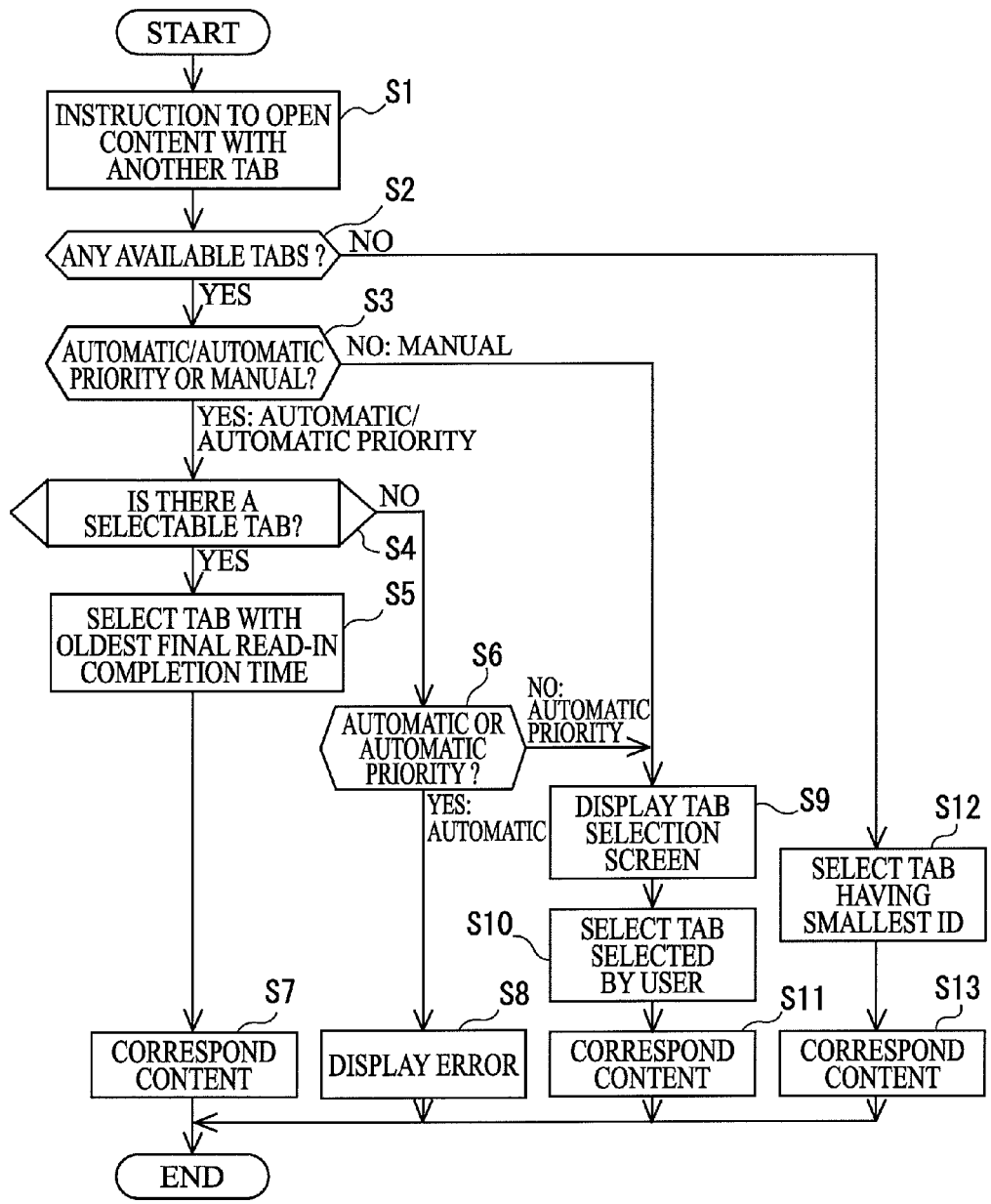
FIG. 14 is a flowchart showing a flow of a tab selection operation according to this embodiment.

FIG. 14 is a flowchart showing a flow of the tab selection operation according to this embodiment.

In response to the user's manipulation of the operation input unit 2 of the portable game apparatus 1 to activate the tab browser, the CPU 41 reads out the tab browser and various programs from the ROM 44 to the main memory 43. Execution of the tab browser and various programs read out from the main memory 43 is started, processing as follows. First, when the user enters the URL for the contents stored in the server apparatus 400 to instruct access to the server apparatus 400, the CPU 41 accordingly starts communication with the server apparatus 400 via the wireless communication unit 80, the wireless communication system 200 and the Internet 300. The CPU 41 generates request data indicating a request for a content and then transmits it to the server apparatus 400 via the wireless communication unit 80, the wireless communication system 200 and the Internet 300.

Upon reception of the request data from the portable game apparatus 1 via the transmitter/receiver 403, the control unit 401 of the server apparatus 400 reads out a requested content from the storage unit 404, generates response data including the content, and transmits the response data to the portable game apparatus 1 via the transmitter/receiver 403, the Internet 300 and the wireless communication system 200 in response to the request data.

Upon reception of the response data from the server apparatus 400, the CPU 41 of the portable game apparatus 1 corresponds the content included in the response data to the tab 1. The CPU 41 then writes the URL for the content to the content URL of the tab 1 in the tab status table 43A. The CPU 41 then temporarily stores the content in the main memory 43. Afterwards, the CPU 41 generates a texture for the content and commands the graphics system 50 to draw a content image using that texture. The graphics system 50 draws the content image by mapping the texture onto the content drawing area for the tab in the frame buffer 53 in response to the drawing command from the CPU 41. Furthermore, the CPU 41 rewrites the value of the active flag for the tab 1 in the tab status table 43A to '1', thereby changing the tab 1 into an active state, and rewrites the value of the active flag for the tabs 2 through 4 to '0' and the value of the content flag for the tab 1 to '1'. As described in <Display Control for Tabs> of the structure section, the CPU 41 determines the colors to be displayed on the tab bars for the respective tabs and the lengths thereof, and commands the GPU 52 to draw based on the determined colors and lengths. As a result, by displaying on the display unit 3 the content image drawn in the frame buffer 53, the content image of the content corresponded to the tab 1 is displayed on the display unit 3, as shown in FIG. 11.

Next, in response to the user's manipulation of the operation input unit 2 of the portable game apparatus 1 to position the pointer P1 at the item K2 for a desired content (in this case, 'BBB News') in the tab browser screen TG as shown in FIG. 11 and press the circle marked button 22A for a predetermined duration or longer, the CPU 41 detects this manipulation and determines that an instruction to display the content image at a tab other than the tab 1 has been given (step S1 shown in FIG. 14). The CPU 41 generates request data indicating to request the content and then transmits to the server apparatus 400.

Upon reception of the request data from the portable game apparatus 1, the control unit 401 of the server apparatus 400 reads out the requested content from the storage unit 404, generates response data including this content, and transmits the data to the portable game apparatus 1 in response to the request data.

Upon reception of the response data from the server apparatus 400, the CPU 41 of the portable game apparatus 1 temporarily stores in the main memory 43 the content included in the response data. The CPU 41 also temporarily stores in the main memory 43 the time when reception of the content has completed.

Note that in the case where the content requested in the step S1 is an SSL-based content, the server apparatus 400 transmits the response data based on the SSL. The CPU 41 of the portable game apparatus 1 then temporarily stores it transmitted from the server apparatus 400 in the main memory 43. Furthermore, in the case where the response data is transmitted based on the SSL, the CPU 41 temporarily stores the value '1' of the SSL/non-SSL flag in the main memory 43.

Afterwards, the CPU 41 searches the tab status table 43A for a tab to which a content is not corresponded (step S2). In other words, it searches the content flags in the tab status table 43A for a tab with a content flag '0'.

In the case where it is determined that there is no tab with a content flag '0' (YES in step S2) as a result of the search, it is then determined whether or not automatic selection of a tab for displaying the content image is possible (step S3). In other words, it is determined whether or not the automatic/manual flag is '1' or '3'. In the case where the automatic/manual flag is determined to be '1' or '3' (YES in step S3), processing proceeds to a determination step S4 in which it is determined whether or not there is a selectable tab among the tabs 1 through 4.

Figure 15:
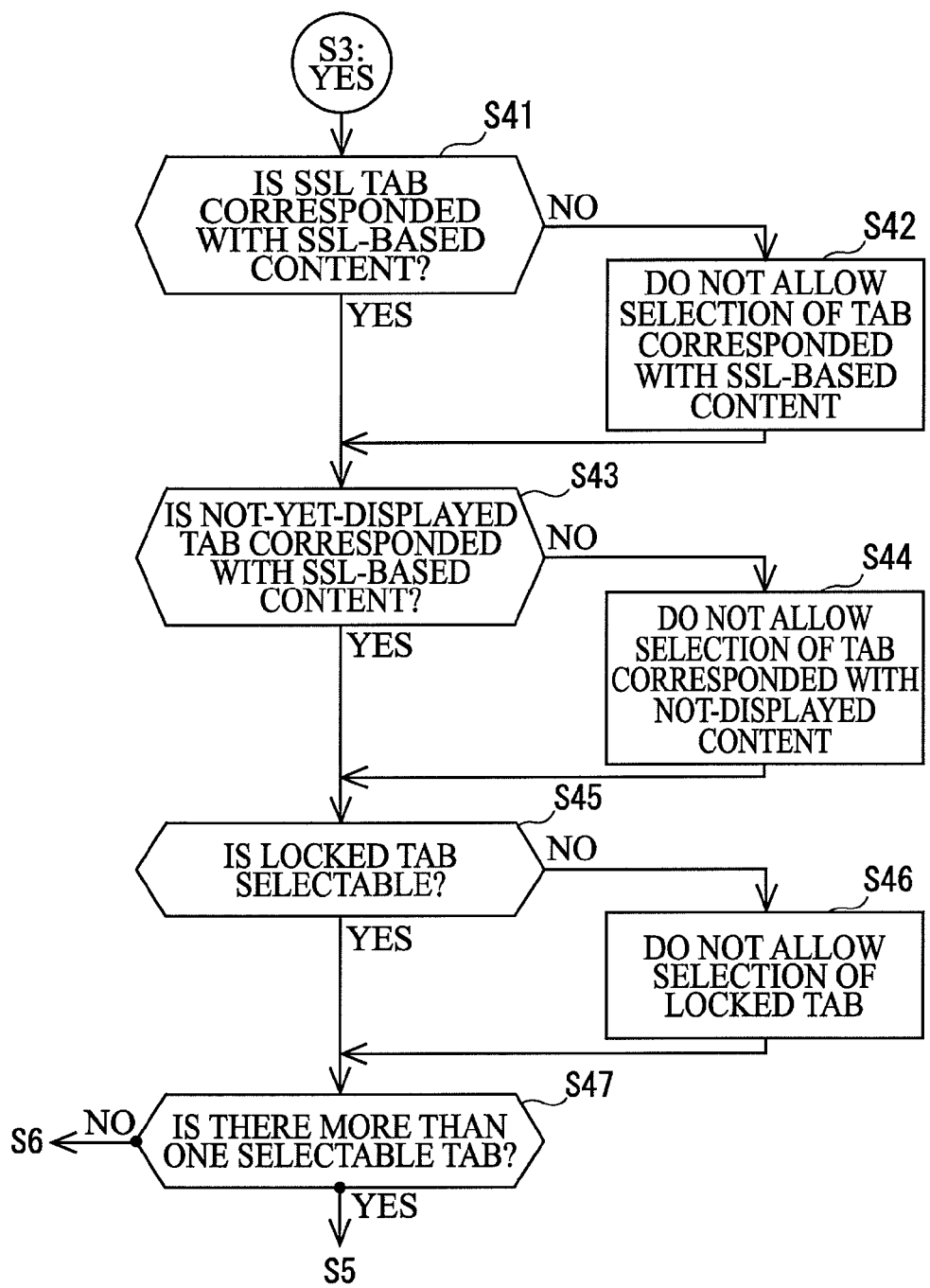
FIG. 15 is a flowchart showing a flow of the tab selection operation according to this embodiment.

Details of the processing in the determination step S4 are shown in FIG. 15. In step S41 of FIG. 15, it is determined whether or not a tab to which an SSL-based content image is corresponded is selectable, namely whether or not the SSL flag in the tab-switching setting table 43B is '0'. In the case where the result of this determination is positive (YES in step S41), processing proceeds to step S43. In the case where the result of this determination is negative in step S41 (NO in step S41), the tab where the SSL/non-SSL flag in the tab status table 43A is '1' is regarded as non-selectable (step S42), and processing proceeds to step S43.

In step S43, it is determined whether or not a tab to which an non-displayed content is corresponded is selectable, namely whether or not the not-yet-displayed flag in the tab-switching setting table 43B is '0'. In the case where the result of this determination is positive (YES in step S43), processing proceeds to step S45. In the case where the result of this determination is negative in step S43 (NO in step S43), the tab where the not-yet-displayed/displayed flag in the tab status table 43A is '1' is regarded as non-selectable (step S44), and processing proceeds to step S45.

In step S45, it is determined whether or not a tab to which a locked content is corresponded is selectable, namely whether or not the lock flag in the tab-switching setting table 43B is '0'. In the case where the result of this determination is positive (YES in step S45), processing proceeds to step S47. In the case where the result of this determination is negative in step S45 (NO in step S45), the tab where the locking flag in the tab status table 43A is '1' is regarded as non-selectable (step S46), and processing proceeds to step S47.

In step S47, it is determined whether or not there are one or more non-selectable tabs from the tabs 1 through 4. In other words, it is determined whether or not one or more tabs from the tabs 1 through 4 are selectable. In the case where the result of this determination is positive (YES in step S47), processing proceeds to step S5 of FIG. 14. In the case where the result of this determination is negative in step S47 (NO in step S47), processing proceeds to step S6 of FIG. 14.

Figure 16:
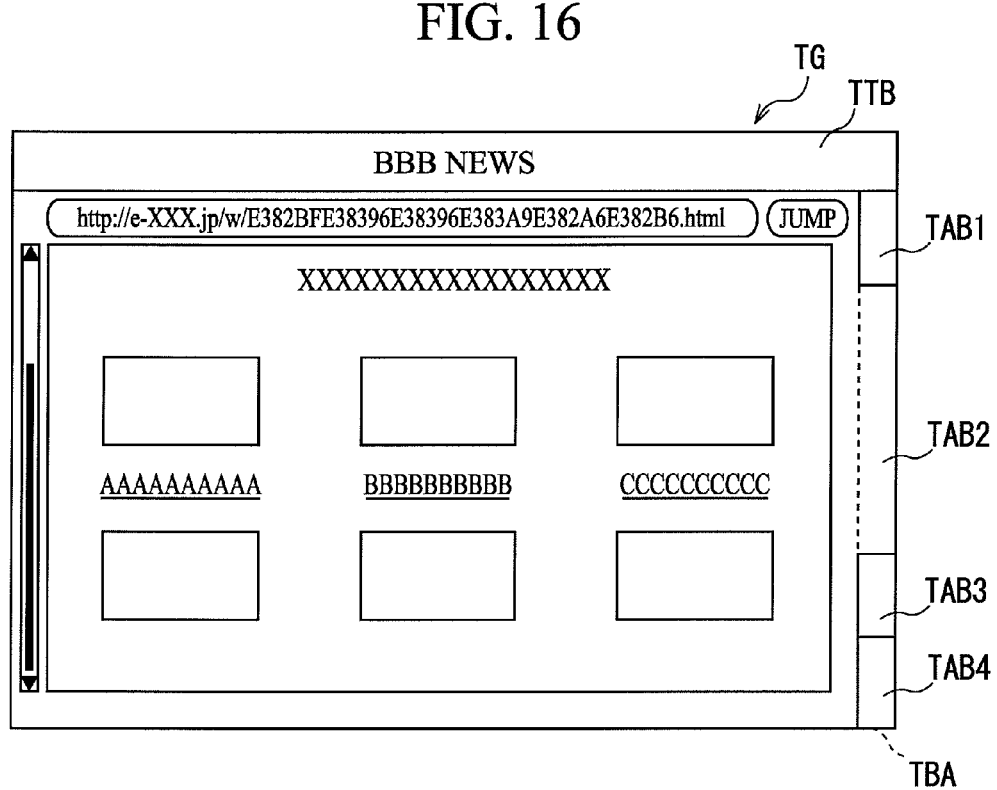
FIG. 16 shows an exemplary screen displayed on the display of this embodiment.

Returning to FIG. 14, in step S5, the CPU 41 searches the tab status table 43A for the final read-in compilation time and then selects the tab corresponding to the oldest time from the selectable tabs (step S5). Then, the CPU 41 corresponds a content stored in the main to the selected tab. Afterwards, the CPU 41 generates a texture for the content and commands the graphics system 50 to draw a content image using that texture. The graphics system 50 maps the texture generated by the CPU 41 onto the content drawing area for the tab in the frame buffer 53 in response to the drawing command from the CPU 41, thereby drawing the content image in the frame buffer 53. Meanwhile, the CPU 41 also causes it to draw for the respective tab bars in the same manner as display control at the tabs. As a result, the CPU 41 controls so that the image drawn in the frame buffer 53 can be displayed on the display unit 3. Accordingly, for example, as shown in FIG. 16, with the tab 2 in an active state, the content image instructed by the user in step S1 is displayed on the display unit 3.

Furthermore, in the case where the content is an SSL-based content, the CPU 41 rewrites the value of the SSL/non-SSL flag corresponding to said tab in the tab status table 43A to '1' using the value '1' of the SSL/non-SSL flag stored in the main memory 43. Moreover, the CPU 41 writes in the tab status table 43A the final read-in completion time stored in the main memory 43.

The CPU 41 then writes the URL for the content to the content URL of the selected tab in the tab status table 43A.

Furthermore, the CPU 41 rewrites to '1' the value of the not-yet-displayed/displayed flag in the tab status table 43A corresponding to said tab, rewrites the values of the active flags for the tabs in the tab status table 43A to '1', and rewrites the values of the active flags for the other tabs 1 through 4 to '0'.

Note that in the case where the CPU 41 determines there is no selectable tab in the determination step S4, namely the case where the CPU 41 determines there is not a single selectable tab in step S47, then the CPU 41 determines whether the selection mode is either automatic selection or automatic selection priority by accessing the tab-switching setting table 43B (step S6). In other words, the CPU 41 determines whether the automatic/manual flag is either '1' or '3'. In the case where the automatic/manual flag is '1' (YES in step S6), the CPU 41 controls so that a message such as 'cannot be displayed' can be displayed on the display unit 3 (step S8).

Figure 17:
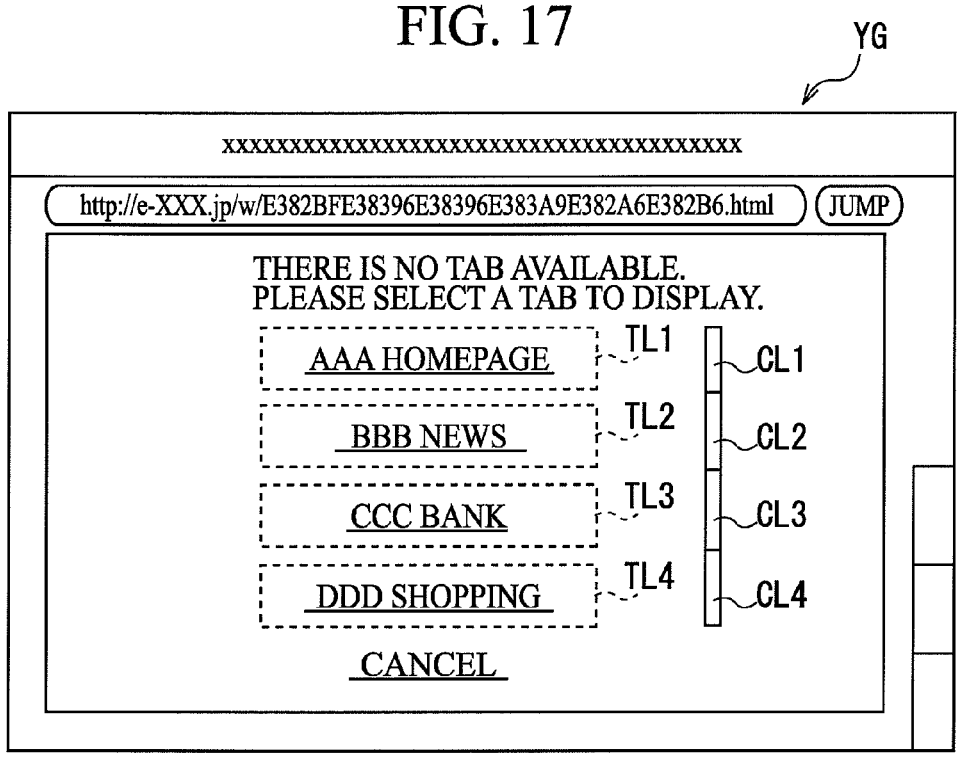
FIG. 17 shows an exemplary screen displayed on the display of this embodiment.

In the case where the CPU 41 determines in step S6 that the automatic/manual flag is '3' (NO in step S43), or in the case where the CPU 41 determines in step S3 that the automatic/manual flag is '2' (NO in step S3), the CPU 41 controls so that a user selection screen YG as shown in FIG. 17 can be displayed on the display unit 3. A message "There is no available tab. Please select a tab to display a content", title names TL1 through TL4 for the contents corresponded to the respective tabs, and colors CL1 through CL4 corresponded to the respective tabs are displayed in this screen. Note that the title name TL1 for the content corresponded to the tab (tab 1 in this case) for which an instruction to display the content image is carried out in step S1 and the color CL1 corresponded to this tab need not be displayed in this screen. In other words, a tab for which an instruction to display a content image at another tab is given may be a non-selective tab.

In response to the user's manipulation of the operation input unit 2 in this screen to select the title name of the content corresponded to a desired tab, the CPU 41 corresponds the content stored in the main memory 43 to the selected tab (step S11), and then writes in the tab status table 43A the final read-in completion time stored in the main memory 43.

Furthermore, in the case where the CPU 41 determines in step S2 that there are tabs with a content flag '0' (NO in step S2), the CPU 41 selects the tab having the smallest ID therefrom (step S12). The CPU 41 corresponds the content stored in the main memory 43 to the selected tab (step S13), and then writes the final read-in completion time stored in the main memory 43 in the tab status table 43A.

In this manner, when there is an instruction to display the content image at another tab, the portable game apparatus 1 selects from the tabs 1 through 4 a tab to which the content is corresponded. This allows the user to conveniently use contents even with a limited number of tabs.

Furthermore, a tab selection condition such that a tab considered to be unbeneficial for the user is determined as a non-selectable tab may be set. This allows improvement in user-friendliness. More specifically, for example, in the case where an SSL-based content related to a product purchasing procedure or an SSL-based content related to a finance-related procedure is corresponded to the tab, making this tab non-selectable allows elimination of inconveniences such as a procedure for SSL-based contents being interrupted. Making the tab to which an not-yet-displayed content is corresponded be non-selectable also allows elimination of inconveniences such as interfering with use of contents.

Figure 18:
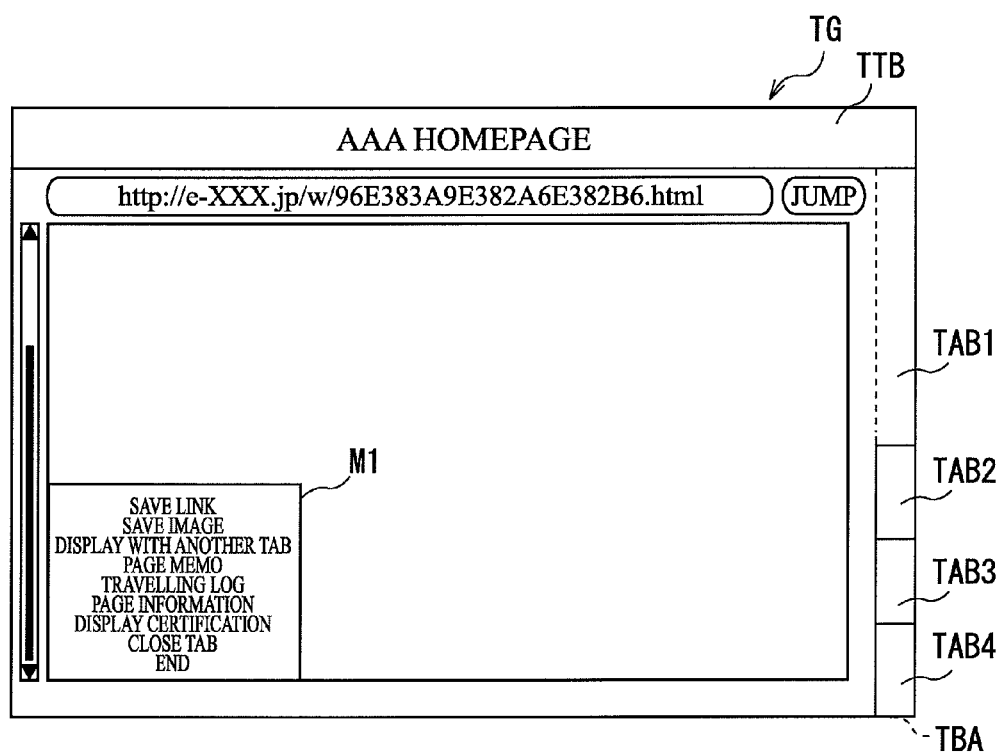
FIG. 18 shows an exemplary screen displayed on the display of this embodiment.

Note that when the user manipulates the operation input unit 2 of the portable game apparatus 1 to press the triangle marked button 22B when selecting a desired content in the screen as shown in FIG. 11, the CPU 41 may detect a signal for that manipulation and display a menu image M1 as shown in FIG. 18 on the display unit 3.

In response to the user's manipulation of the operation input unit 2 to press the circle marked button 22A in this menu image M1 with the pointer P1 at a position of an item reading 'display content at another tab', the CPU 41 detects a signal for that manipulation and carries out the processing after step S2. Since the remaining operations are the same as in the above descriptions, descriptions thereof are omitted.

Furthermore, for example, in the screen as shown in FIG. 11, when the user presses, for example, the triangle marked button 22B and the cross marked button 22D simultaneously, title names of the contents corresponded to the tabs 1 through 4 may be displayed in a list.

Second Embodiment

Next, an embodiment for displaying content read-in statuses (processing progress statuses) for respective tabs is described. A description of the same parts as those in the above first embodiment is omitted or the same parts are described forthwith using the same reference numerals as those in the above first embodiment.

Note that with this embodiment, content includes main data and component data associated to the main data. More specifically, the main data denotes data such as an HTML file, and relates to the layout of a content image representing the content. The component data denotes data such as image data associated to the HTML file. More specifically, it denotes data to which is corresponded a URL indicating the stored location of the data in the HTML file. The CPU 41 receives the HTML file, accesses the URL indicated in the HTML file, and then downloads data corresponded to the URL, when receiving the content.

The main data further includes component number data indicating the number of pieces of component data associated to the main data.

(1) Structure

<Structure of Portable Game Apparatus>

The main memory 43 is stored with a tab status table 43A'.

The tab status table 43A' shows the statuses of respective tabs, and as shown in FIG. 19, is stored with an active flag, a content flag, a component number, a read component number, a read-in status, a reading flag, and a content URL for each tab.

The active flag denotes a flag indicating whether or not the tab is active, where a value of '1' indicates that it is active, and a value of '0' indicates that it is inactive. Note that in the case where a tab to be activated is selected by the user via the operation input unit 2, the CPU 41 detects a signal for that operation, rewrites the value of the active flag corresponding to that tab to '1', and rewrite all values of the active flags corresponding to the other tabs to '0'.

Since the content flag and content URL are the same as in the above first embodiment, descriptions thereof are omitted.

A read-in status indicates the progress status of processing from reception of a content downloaded from the server apparatus 400 to drawing, and has a main data read-in completion flag, an analysis completion flag, and a layout completion flag.

The main data read-in completion flag denotes a flag showing whether or not read-in of the main data included in the content is completed, where '1' is written in by the CPU 41 upon completion of the reception of the main data. The analysis completion flag denotes a flag showing whether or not analysis of the main data is completed, where '1' is written in by the CPU 41 upon completion of the analysis by a content generating engine.

The layout completion flag denotes a flag showing whether or not layout processing of the main data is completed, where '1' is written in by the CPU 41 upon completion of the layout processing.

The component number indicates the number of pieces of component data included in the main data. When the content generating engine E1' analyzes the main data, the value indicated by the component number data included in the main data is written to the component number by the CPU 41.

The read component number indicates the number of pieces of component data for which reception has been completed, the component data included in a content and stored in the main memory 43. This number is written by the CPU 41 at a timing described later.

The reading flag indicates whether or not a content corresponded to that tab is being read, namely whether or not a processing sequence from reception of the content to drawing is in progress. A value of '1' indicates that it is being read, and a value of '0' indicates that it is not. The reading flag is accessed by the CPU 41 when determining whether or not calculation of read-in statuses for the respective tabs is necessary. The CPU 41 determines that calculation of a read-in status is necessary when the value of the reading flag is '1'.

Note that '0' is set as the initial value to the values of the above-given respective flags in the initial state.

Figure 20:
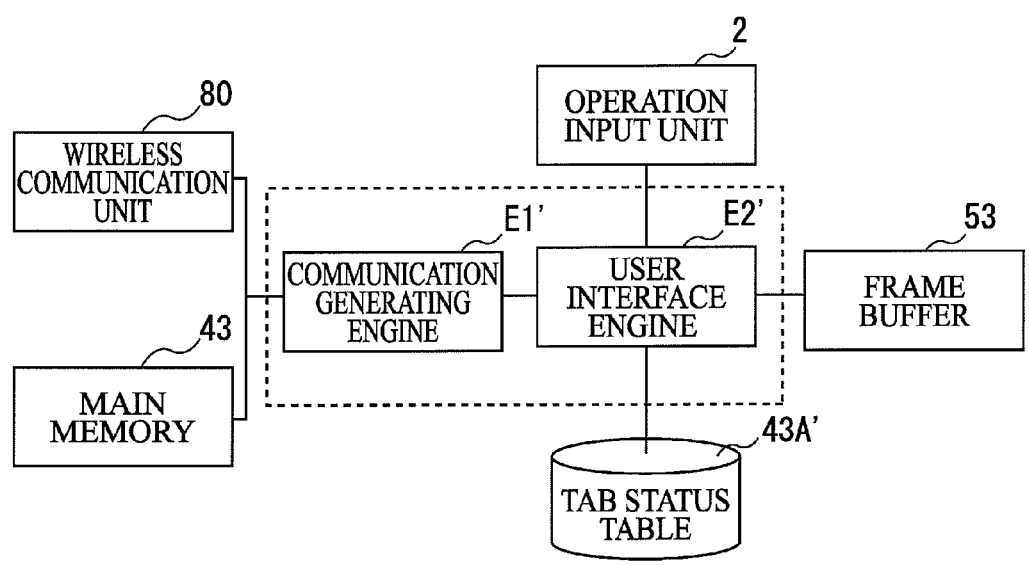
FIG. 20 is a block diagram describing a functional structure of the portable game apparatus of this embodiment.

Furthermore, the ROM 44 is stored with a program which is executed by the CPU 41 for implementing function to display read-in statuses of contents in the respective tabs. This function is described here. FIG. 20 is a block diagram describing a functional structure of the portable game apparatus 1. The portable game apparatus 1 has a content generating engine E1' and a user interface engine E2'. The entities of these engines are programs executed by the CPU 41. Various kinds of processing are carried out by each part of the portable game apparatus 1, such as the GPU 52, in response to control commands by the CPU 41 during the execution processes of this program, thereby implementing the functions of these engines.

When the user gives an instruction to download a desired content via the operation input unit 2, the user interface engine E2' detects a signal for this operation and gives an instruction to the content generating engine E1' to download the content from the server apparatus 400.

The content generating engine E1' then requests the server apparatus 400 for transmission of the content via the wireless transmission unit 80 in response to an instruction to download the content from the server apparatus 400. The content generating engine E1' sequentially receives response data from the server apparatus 400 via the wireless communication unit 80. At this time, the content generating engine E1' receives the main data and the component data of the content included in the response data in this order and temporarily stores them in the main memory 43.

The content generating engine E1' carries out analysis and layout processing of the main data, generates a texture for the main data, and then sends this to the user interface engine E2'.

The content generating engine E1' sends to the user interface engine E2' pieces of information to indicate the effect that reception of the main data has been completed, analysis of the main data has been completed, and layout processing of the main data has been completed. Furthermore, the content generating engine E1' sends the number of pieces of component data included in the content and the number of pieces of component data having been received to the user interface engine E2'.

The user interface engine E2' calculates a read-in status of the content based on the information received from the content generating engine E1'. With this embodiment, rate of the progress status of processing until drawing the content is completed is calculated as the read-in status. Length of a read-in display bar (described later) for the tab corresponded to the content is then determined based on this calculation. Drawing for tab bars including read-in display bars for the respective tabs as well as drawing the content are carried out into the frame buffer 53.

<Display Control for Tabs>

Display control for tabs according to this embodiment is described forthwith. Note that only parts differing from display control for the tabs described in the above first embodiment are described in order to avoid duplicate descriptions.

With the above-given first embodiment, in the case where the values of the content flags for the respective tabs are '1', the colors of the tab bars are the basic colors made darker.

Figure 21:
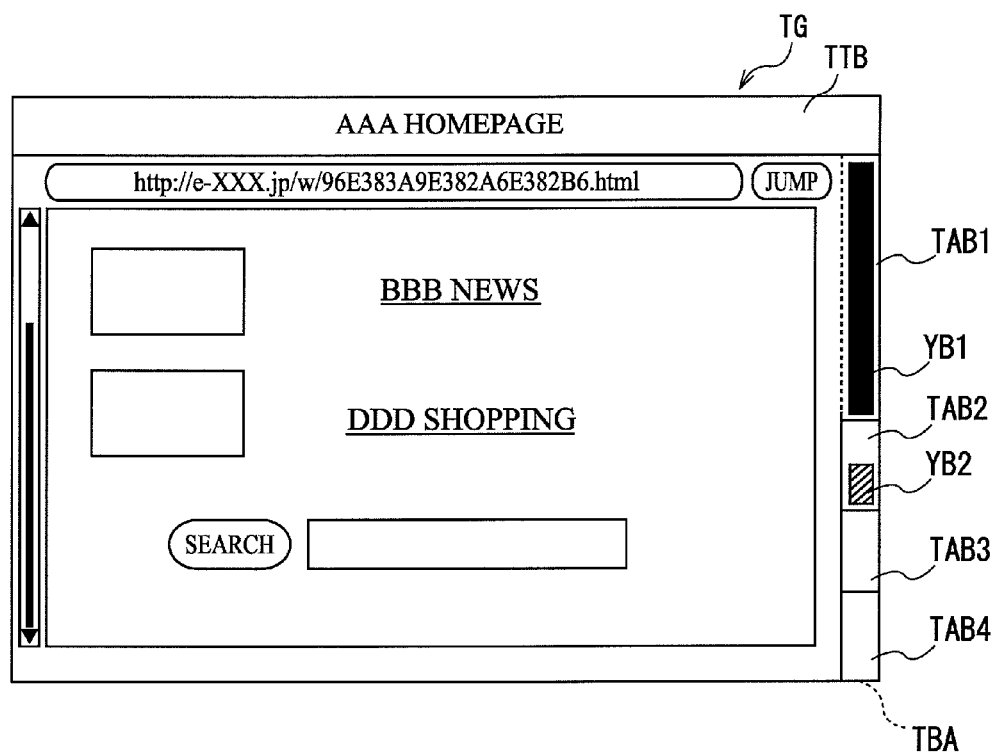
FIG. 21 shows an exemplary screen displayed on a display of this embodiment.

With this embodiment, in the case where the values of the content flags for the respective tabs are '1', the read-in display bar representing the read-in statuses of the contents corresponded to the tabs is displayed on the tab bars for the tabs. In the example of FIG. 21, a read-in display bar YB1 is displayed on the tab bar TAB1 for the tab 1, and a read-in display bar YB2 is displayed on the tab bar TAB2 for the tab 2.

The CPU 41 changes the length of the read-in display bar in accordance with the calculated read-in status, and controls so that the length of the read-in display bar can be almost equal to the longitudinal length of the tab bar for the tab when the read-in status corresponds to 100%, and that the length of the read-in display bar can be '0' when the read-in status corresponds to 0%. Furthermore, the colors of those read-in display bars are the basic colors of the tab bars made darker, and the colors of the remaining tab bars of the read-in display bar are the basic colors made lighter.

Figure 22:
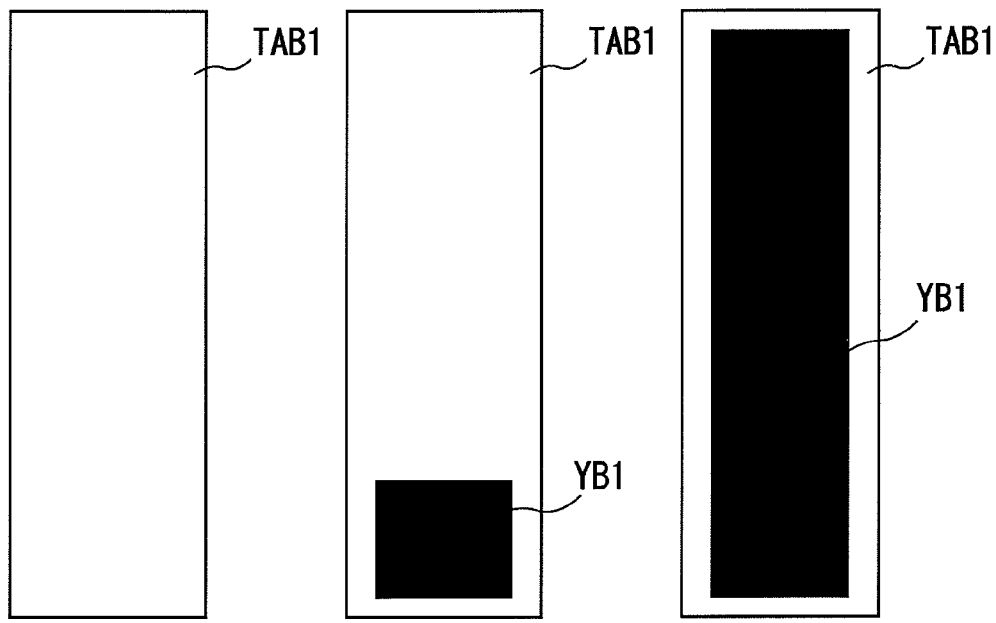
FIG. 22 shows an exemplary read-in display bar displayed on the display of this embodiment.

Details are described while referencing FIGS. 22(a) through (c). For example, since the length of the read-in display bar is '0' when the read-in status corresponds to 0% calculated by the CPU 41, the read-in display bar is not displayed, and as shown in FIG. 22(a), the entire tab bar for the tab becomes the basic color of the display area made lighter.

Furthermore, when the read-in status corresponds to 10%, the length of the read-in display bar is 10% the length of the tab bar for that tab, the color thereof is the basic color of the tab bar for that tab made darker, and the remaining 90% of the tab bar for the tab is the basic color of the tab bar made lighter, as shown in FIG. 22(b).

When the read-in status corresponds to 100%, the length of the read-in display bar is almost the same as that of the tab bar for the tab, and nearly the entire tab bar for the tab is the basic color of the display area made darker, as shown in FIG. 22(c).

The rest of the structure of the portable game apparatus 1 is nearly the same as that given in the first embodiment.

<Structure of Server Apparatus>

The storage unit 404 of the server apparatus 400 is stored with the above-mentioned contents.

The rest of the structure is nearly the same as that of the first embodiment.

(2) Operations

Next, operations according to this embodiment are described.

Figure 23:
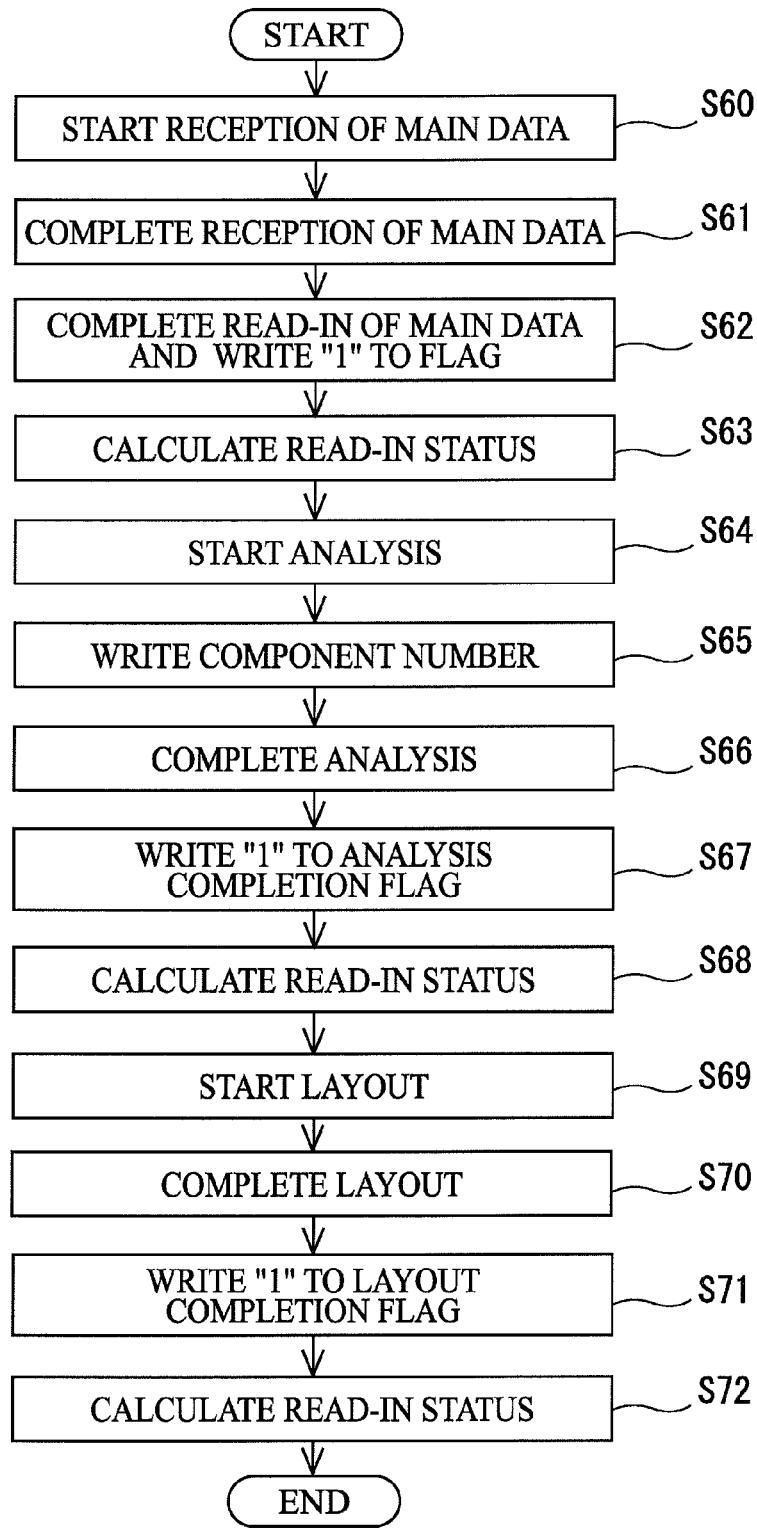
FIG. 23 is a flowchart showing a flow of an operation of this embodiment.

FIG. 23 is a flowchart showing a flow of the operations according to this embodiment.

Figure 25:
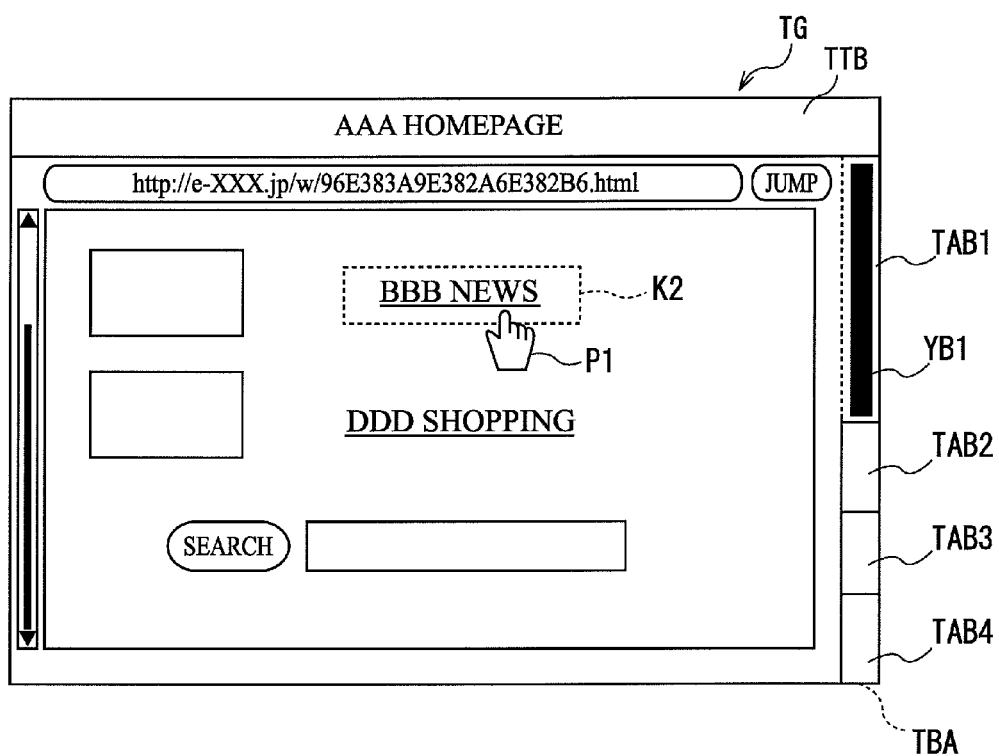
FIG. 25 shows an exemplary screen displayed on a display of this embodiment.

Note that with this embodiment, for example, as with the above-given first embodiment, the user manipulates the operation input unit 2 of the portable game apparatus 1 to position the pointer P1 at an item K2 for a desired content (in this case, 'BBB News') in the tab browser screen TG as shown in FIG. 25 and press the circle marked button 22A for a predetermined duration or longer. As with the first embodiment, the CPU selects the tab to which the content is corresponded, for example, the tab 2.

The CPU 41 generates request data indicating to request the instructed content and then transmits it to the server apparatus 400. Upon reception of the request data from the portable game apparatus 1, the control unit 401 of the server apparatus 400 reads out the content indicated in the transmitted request data from the storage unit 404 and generates response data including the content. The control unit 401 then transmits the generated response data to the portable game apparatus 1.

The CPU 41 of the portable game apparatus 1 sequentially receives the response data from the server apparatus 400. At this time, the CPU 41 receives the main data and the component data of the content included in the response data in this order. The CPU 41 corresponds the received data to the tab 2 and then temporarily stores it in the main memory 43.

The CPU 41 starts reception of the main data (step S60), completes it (step S61), and then rewrites the value of the main data read-in completion flag in the tab status table 43A' to '1' (step S62). The CPU 41 then calculates a read-in status R (0≤R≤1) of the content according to the following equation 1 (step S63).

$$R = \{flag\, 1 \times W1 + flag\, 2 \times W2 + flag\, 3 \times W3 + (\text{read component number/component number}) \times W4\} / (W1 + W2 + W3 + W4) \quad \text{Equation 1}$$

Note that with the equation 1, the flag 1 indicates the value of the main data read-in completion flag, the flag 2 indicates the value of the analysis completion flag, and the flag 3 indicates the value of the layout completion flag. In addition, W1, W2, W3, and W4 are preset positive constants. Furthermore, the value of 'read component number/component number' is rewritten as '0' when the value of the read component number is '0' and the component number is '0'.

Note that at this time, the value of the flag 1 is '1', the value of the flag 2 is '0', the value of the flag 3 is '0', the read component number is '0', and the component number is '0', and the read-in status corresponding to these values is calculated. The CPU 41 then accesses the tab status table 43A' and determines colors and lengths of the tab bars for the respective tabs. In this case, since the value of the active flag for the tab 2 is '0', the CPU 41 sets the length of the tab bar TBA2 for the tab 2 to a sixth of the entire tab bar display area TBA, and determines the length of the read-in display bar YB2 displayed in the tab bar TAB2 using the length of the tab bar TAB2 and the calculated read-in status. More specifically, the length of the read-in display bar YB2 is set to be equal to length of the tab bar TAB2 for the tab 2 multiplied by R. Afterwards, the CPU 41 commands the graphics system 50 to draw a content image at the tab bar TAB2 including the read-in display bar YB2. The graphics system 50 draws in the frame buffer 53 in response to the draw command from the CPU 41, and then the CPU 41 controls so that the image drawn in the frame buffer 53 can be displayed on the display unit 3, thereby displaying the tab bar TAB2 and the read-in display bar YB2 on the display unit 3 as shown in FIG. 21.

Note that since the tab 1 is active in this case, the content image of the content corresponded to the tab 1 is displayed on the display unit 3. However, in this case, for example, when the user operates the operation input unit 2 to activate the tab 2, the GPU 52 carries out the drawing for the content corresponded to the tab 2 and at the same time the CPU 41 controls so that every scanning unit of a drawn image can be displayed on the display unit 3. In addition, at this time, the CPU 41 changes the length of the tab bar TAB2 to that of when the active flag is '1', and further changes the length of the read-in display bar YB2 in accordance to the length of the tab bar TAB2, as described in the structure section of the first embodiment. The active flags for the other tabs are set to '0', and the lengths of the respective tab bars are changed according to that value and the length of the read-in display bar is changed in accordance to those lengths. The CPU 41 displays the respective tab bars and read-in display bar changed in this manner on the display unit 3.

Furthermore, the CPU 41 carries out analysis of the main data once reception of the main data is completed (step S64). The CPU 41 reads out the component number data from the main data, and writes the value of the component number indicated in this data to the component number in the tab status table 43A' (step S65). The CPU 41 completes analysis of the main data (step S66) and then rewrites the value of the analysis completion flag in the tab status table 43A' to '1' (step S67). As described above, the CPU 41 calculates the read-in status using the above-given equation 1 (step S68) and then controls so that the read-in display bar YB2 for the tab 2 can be displayed on the display unit 3.

Furthermore, the CPU 41 starts layout processing for the main data in accordance with the analysis results of the main data (step S69). Afterwards, it generates a texture for the main data and commands the graphics system 50 to draw a content image using that texture. The graphics system 50 maps the texture generated by the CPU 41 onto the frame buffer 53 in response to the drawing command from the CPU 41, thereby drawing an image (layout image) for the main data.

The CPU 41 completes layout processing for the main data (step S70) and then rewrites the value of the layout completion flag in the tab status table 43A' to '1' (step S71). As described above, the CPU 41 calculates the read-in status using the above-given equation 1 (step S72), and based on this, then controls so that the read-in display bar YB2 for the tab 2 on the display unit 3.

Figure 24:
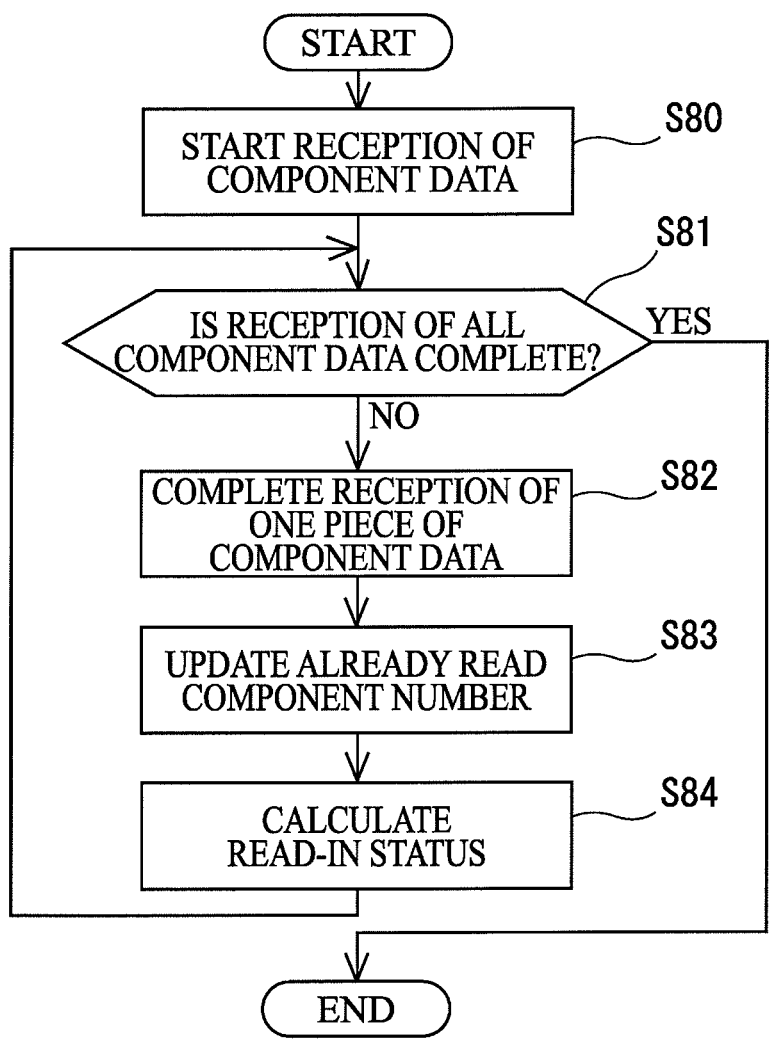
FIG. 24 is a flowchart showing a flow of an operation of this embodiment.

Furthermore, as shown in FIG. 24, the CPU 41 receives component data (step S80) in parallel to the processing of steps S62 to S72, and then combines the component data and the above layout image every time reception of the component data included in a content is concluded. More specifically, in the case where the image data is component data, the CPU 41 commands the graphics system 50 to draw the image for the component data. The graphics system 50 maps the image for the component data onto the frame buffer 53.

Furthermore, upon reception of each piece of component data (step S83), the CPU 41 increments the read component number stored in the main memory 43 by 1 (step S83). The CPU 41 writes the read component number stored in the main memory 43 to the value of the read component number in the tab status table 43A'. The CPU 41 calculates the read-in status using the above-given equation 1 (step S84), and based on this, then displays the read-in display bar YB2 for the tab 2 on the display unit 3.

The CPU 41 repeats the steps S82 through S84 until reception of all the pieces of component data included in the above content is completed.

Figure 26:
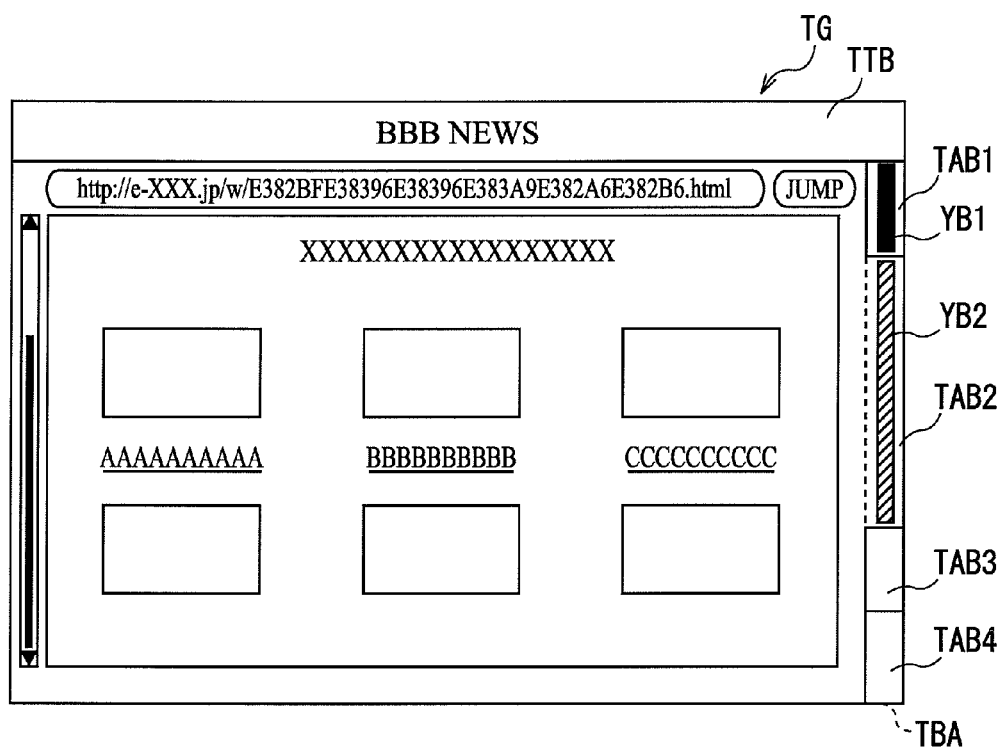
FIG. 26 shows an exemplary screen displayed on the display of this embodiment.

When reception of all the pieces of component data and processing of the steps S83 through S84 are completed, all of the content images for the content are then displayed on the display unit 3, as shown in FIG. 26. Furthermore, the value of the read-in status R of the tab 2 becomes '1', the length of the read-in display bar YB2 is almost the same as that of the tab bar TAB2, and nearly the entire tab bar TAB2 is the basic color of the display area made darker.

Note that with the above description, only one tab (tab 2) has been described; however, the same holds true for the tabs 1, 3, and 4, where the CPU 41 determines the lengths and colors of the tab bars in conformity with the active flags and the content flags, displaying them according to the determined lengths and colors.

Furthermore, when downloading contents and drawing the contents for the other tabs 1, 3, and 4 concurrently to that for the tab 2, the lengths and colors of the tab bars are determined in conformity with the active flags and the content flags, and the tab bars are displayed according to the determined lengths and colors, as with the above-described tab 2.

Note that the CPU 41 may determine the length and color of the read-in display bar after determining whether or not calculation of the read-in status is necessary by accessing the reading flags in the tab status table 43A'.

Furthermore, when there is no content corresponded to a tab, namely when the content flag is '0', or when the value of the read-in status R is '0' even if the content flag is '1', the read-in display bar is not displayed since the length thereof is '0'.

According to such structure, regardless of the tab being active or inactive, the read-in status of the content corresponded to that tab is displayed. Accordingly, the user may easily confirm the read-in status of the content corresponded to the tab and may more smoothly carry out operations regardless of the tab being active or inactive.

MODIFIED EXAMPLES

Modified Example 1

With the above-given embodiments, the content generating engines E1 and E1' and the user interface engines E2 and E2' are functions implemented through execution of programs stored in the ROM 44 by the CPU 41. However, the present invention is not limited to this, and the content generating engines E1 and E1' and the user interface engines E2 and E2' may be constituted by hardware such as a microcomputer.

Modified Example 2

The portable game apparatus 1 of the above-given embodiments may include the structure and functions of both the first embodiment and the second embodiment.

Modified Example 3

With the above-given embodiments, the number of tabs is fixed at 4. However, the present invention is not limited to this number, and the number of tabs may be changed by adding or deleting tabs without fixing the number thereof.

Alternatively, a structure with which the upper limit of the number of tabs is set and tabs are arbitrarily added until that limit may be used. With this structure, for example, in the case where there is an instruction to display a new content image when the number of tabs has reached that limit, as with the first embodiment, a tab to be corresponded to the content may be selected from multiple tabs.

Furthermore, tab displaying aspects are not limited to that of the above embodiments, where various colors, shapes and visual effects may be added.

Modified Example 4

With the above-given first embodiment, whether content images for contents corresponding to the respective tabs are not-yet-displayed or already displayed may be displayed in the user selection screen YG shown in FIG. 17. For example, in the case where the value of the not-yet-displayed/displayed flag in the tab status table is '0' when displaying the colors corresponding to the respective tabs on CL1 through CL4, the colors of those tabs are displayed lighter, and in the case where the value of the not-yet-displayed/displayed flag is '1', the colors of those tabs are displayed darker.

Furthermore, whether or not the contents corresponding to the respective tabs are being read may be displayed. More specifically, as with the read-in display bars according to the second embodiment, bars having lengths according to read-in statuses may be displayed.

Modified Example 5

With the above-given first embodiment, the user sets a tab selection condition in the setting screen SG. However, the present invention is not limited to this, and a certain selection condition may be pre-stored in the ROM 44 or the main memory 43 instead of the user setting the selection condition, and the CPU 41 may select a tab in accordance to that selection condition.

Furthermore, the selection condition is not limited to those given in the first embodiment and may be one of a variety of other selection conditions.

Modified Example 6

In step S5 of the first embodiment, the tab with the oldest final read-in completion time is selected from the selectable tabs. However, the present invention is not limited to this, and the tab in the longest already displayed state may be selected. More specifically, the times (already displayed times) when rewriting the value of the not-yet-displayed/displayed flag in the tab status table 43A for each tab from '0' to '1' may be respectively stored, and the already displayed times may then be cleared when rewriting the values of the not-yet-displayed/displayed flags from '1' to '0'. In step S5, the CPU 41 then selects the tab stored with the oldest time from the already displayed times of the selectable tabs.

Alternatively, in step S5, the tab in the longest inactive state may be selected. More specifically, the times (active times) when rewriting the value of the not-yet-displayed/displayed flag in the tab status table 43A for each tab from '1' to '0' may be respectively stored, and the active times may then be cleared when rewriting the values of the not-yet-displayed/displayed flags from '0' to '1'. In step S5, the CPU 41 then selects the tab stored with the oldest time from the active times of the selectable tabs.

Furthermore, in step S5, a tab other than tabs to which are corresponded either SSL-based contents, already displayed contents, or locked contents may be selected with priority from the selectable tabs. More specifically, a selecting order for the selectable tabs is preset according to, for example, respective values of the SSL/non-SSL flags, the not-yet-displayed/displayed flags and the locking flags in the tab status table 43A. A tab with '0' for all values of the SSL/non-SSL flag, the not-yet-displayed/displayed flag and the locking flag is selected first, a tab with '0' for any two of the above flags is selected second, and a tab with '0' for any one of the above flags is selected third. In step S5, the CPU 41 accesses the respective values of the SSL/non-SSL flags, the not-yet-displayed/displayed flags, and the locking flags in the tab status table 43A, determines selecting orders for the respective selectable tabs, and then selects the tab with the highest selecting order.

Further in step S5, the CPU 41 may analyze the details of the contents corresponded to the selectable tabs and select a tab based on the analysis results. For example, in the case where the contents are HTML files, the CPU 41 analyzes the lengths of texts written in the HTML files and selects the tab corresponded to the shortest content. Alternatively, a tab may be selected according to content data type corresponded to the selectable tabs. More specifically, the selecting order is preset according to data type of the contents: for example, a content data type of image data such as JPG is to be selected first, motion picture data such as MPEG is to be selected second, and text data is to be selected third. In this case, in step S5, the CPU 41 analyzes the content data types, determines selecting orders for the respective tabs according to the results of this analysis, and selects the tab to be selected last.

Modified Example 7

With the above-given embodiments, a URL for a content is corresponded to a tab so as to correspond the content to the tab. However, the present invention is not limited to this, and a content image stored in the frame buffer 53 may be corresponded to the tab. More specifically, the address of the frame buffer 53 in which the content image of the content is stored is corresponded to the tab. When an operation to activate the tab is carried out via the operation input unit 2, the CPU 41 may access the address of the frame buffer 53 corresponded to that tab, read out the content image of the content corresponded to the tab, and display that image on the display unit 3.

Furthermore, for example, the address for the content stored in the frame buffer 43 may be corresponded to the tab.

Modified Example 8

Content drawing areas corresponding to the respective tabs are further provided in the frame buffer 53 with the above-given embodiments. However, the present invention is not limited to this, and, for example, each time an operation to activate a tab is carried out via the operation input unit 2, the content image of the content corresponded to that tab may be drawn in the frame buffer 53 without providing content drawing areas corresponded to the respective tabs in the frame buffer 53, and the CPU 41 may control for displaying an image on the display unit 3 each time that image is drawn in the frame buffer 53. Alternatively, each time an operation to activate a tab is carried out via the operation input unit 2, the URL for the content corresponded to that tab may be accessed to download the content and draw the content image of the downloaded content in the frame buffer 53.

Modified Example 9

With the above-given embodiments, when an operation to display a content image at another tab is carried out, the CPU 41 activates the selected tab as one to display the content image. However, the present invention is not limited to this, and the tab may be inactive as long as the user does not carry out the activating operation.

Modified Example 10

With the above-given embodiments, the tab bars TAB1 through 4 are displayed on the right end of the tab browser screen TG. However, the present invention is not limited to this, and they may be displayed any place in the tab browser screen TG.

Modified Example 11

Furthermore, with the above-given second embodiment, the read-in status is expressed according to the length of a read-in status display bar. However, the present invention is not limited to this, and, for example, a read-in completion degree may be displayed by letters on the tab bar, or the read-in status may be expressed using an hourglass icon or the like.

Furthermore, a completion degree of content processing is calculated as the read-in status. However, the present invention is not limited to this, and a calculated remaining time until drawing the content is completed may be used as the read-in status.

Alternatively, the read-in status may be expressed by sound instead of as an image. For example, different sounds for respective tabs are output and the CPU 41 then outputs the calculated read-in statuses for the respective tabs via the sound system 60 by the sounds corresponding to the respective tabs. For example, a message such as 'read-in status for the tab 1 is 00%' is output as the sounds each time the read-in status for each tab is updated.

Furthermore, rate of the progress status of all processing for the content is calculated and then output. However, each rate of the progress status of each processing for the content may be output.

Modified Example 12

Further with the above-given second embodiment, calculation of the read-in statuses is carried out based on reception of the main data, analysis of the main data, layout processing of the main data, and reception of the component data.

However, the present invention is not limited to this, and the read-in statuses may be calculated based on processing such as the portable game apparatus 1 communicating with the server apparatus 400 before receiving the content from the server apparatus 400, for example, transmitting request data to the server apparatus 400.

Modified Example 13

With the above-given second embodiment, contents include main data constituted by HTML files and component data associated to the HTML files. However, the present invention is not limited to this, and the contents may be data such as text data, video linear streaming data such as MPEG or MPEG2 type motion picture data, linear audio streaming data such as MP3 type music data, binary program data, or sound data, or a combination thereof.

Furthermore, the component data is data such as image data associated to the HTML files. However, the present invention is not limited to this and may be data representing sound, for example. In the case where the component data is sound data, the CPU 41, for example, commands the sound system 60 to generate waveform data of sound represented by the component data, and the sound system 60 generates and stores the waveform data for the component data in the sound buffer 62. The waveform data and a layout image of the main data associated to the component data may be associated, and when the layout image is displayed on the display unit 3, the waveform data stored in the sound buffer 62 may then be output via the SPU 61 and the speakers 11.

Modified Example 14

With the above-given embodiments, the portable game apparatus 1 having a function of carrying out wireless communication via infrared rays is described as a screen display apparatus. However, the present invention is not limited to this, and it may be a portable telephone or personal handyphone system (PHS) (registered trademark) terminal, a handheld electronic device having a home radio frequency (HomeRF), Bluetooth (registered trademark) or the like as a close range wireless communication function, or a car navigation device. Alternatively, it may be a communication device such as a stationary personal computer having a wireless communication function. Furthermore, the wireless communication system applicable to the present invention may be a personal digital cellular (PDC) network or a PHS (registered trademark) network, for example.

Furthermore, the portable game apparatus 1 and the server apparatus 400 may carry out communication via wires.

INDUSTRIAL APPLICABILITY

The present invention is preferred to be used for a screen display program, a computer readable recording medium recorded with the screen display program, a screen display apparatus, a portable terminal apparatus, and a screen display method.

What is claimed is:
1. A non-transitory computer-readable recording medium having recorded thereon a screen display program to be executed on a computer, said screen display program comprising:

a reception instructing step to instruct reception of content information;
a receiving step to receive the content information in conformity with the instruction of the reception instructing step;
a tab display control step to display a plurality of tabs in a display screen;
a correspondence setting step to correspond the content information received to one of the plurality of tabs;
a drawing step to generate a content image by drawing the content information received and to store the content image;
a content image display control step to display a content image of content information corresponding to an active tab selected from the plurality of tabs, in an area of the display screen other than display areas for the plurality of tabs;
a progress information acquiring step to acquire progress information for processing of at least one or more of the receiving, drawing, and storing of predetermined content information for which reception is instructed; and
a progress status outputting step to display an image corresponding to the progress information acquired in the progress information acquiring step, the displayed image associated to a tab corresponded to the predetermined content information on the display screen, wherein
in the tab display control step, a plurality of tab bars respectively corresponding to the tabs are displayed;
in the progress status outputting step, the image corresponding to the progress information is displayed on the tab bar to which the predetermined content information is corresponded,
the image corresponding to the progress information includes a read-in display bar which displays a degree of the progress of the processing recognizably,
the progress information acquiring step includes a progress status calculating step to calculate a progress status for the processing,
a length of the tab bar corresponding to the active tab is longer than a length of the other tab bar,
a length of the read-in display bar is changed in accordance with the calculated progress status,
the length of the read-in display bar is changed in accordance with whether the tab is active or not, and wherein
the length of the read-in display bar is '0' when the degree of the progress of the processing corresponds to 0% and the length is almost equal to a longitudinal length of the tab bar with the read-in display bar when the degree of the progress of the processing corresponds to 100%, regardless of whether the tab corresponding to the tab bar with the read-in display bar is active or not.

2. The non-transitory computer-readable recording medium according to claim 1, wherein in the progress information acquiring step, regardless of whether or not the tab to which the predetermined content information is corresponded is an active tab, the progress information of the content information corresponded to that tab is acquired.

3. The non-transitory computer-readable recording medium according to claim 1, wherein:
the content information includes main data which determines a layout for a content image;
in the drawing step, analysis of the main data is carried out, and a layout image for the content image is generated based on the analysis results and then stored; and in the progress status calculating step, a progress status of at least one or more of receiving the main data, analyzing it, generating an image, and storing it is calculated.

4. The non-transitory computer-readable recording medium according to claim 3, wherein:
the content information further includes one or more pieces of component data corresponded to the main data;
in the receiving step, the main data is received and then the component data is received;
in the drawing step, the layout image generated based on the main data and the component data are combined; and
in the progress status calculating step, the progress status is calculated based on a ratio of the number of pieces of component data already received to the total number of pieces of component data included in the content information.

5. The non-transitory computer-readable recording medium according to claim 1, wherein:
in the progress status calculating step, a ratio of each processing to the entire processing for which the progress status is calculated is preset; and
in the case where said each processing is completed, the progress status is calculated based on that ratio.

6. The non-transitory computer-readable recording medium according to claim 1, wherein in the tab display control step, the display aspect of the active tab differs from those of other tabs.

7. The non-transitory computer-readable recording medium according to claim 1, wherein in the tab display control step, the display aspect of the tab to which the content information is corresponded differs from those of tabs to which content information is not corresponded.

8. The non-transitory computer-readable recording medium according to claim 1, wherein in the tab display control step, display aspects of the plurality of tabs differ from one another.

9. A computer for executing a screen display program recorded on an included non-transitory computer-readable recording medium, said screen display program comprising:
a reception instructing step to instruct reception of content information;
a receiving step to receive the content information in conformity with the instruction of the reception instructing step;
a tab display control step to display a plurality of tabs in a display screen;
a correspondence setting step to correspond the content information received to one of the plurality of tabs;
a drawing step to generate a content image by drawing the content information received and to store the content image;
a content image display control step to display a content image of content information corresponding to an active tab selected from the plurality of tabs, in an area of the display screen other than display areas for the plurality of tabs;
a progress information acquiring step to acquire a progress information for processing of at least one or more of receiving, drawing, and storing of predetermined content information for which reception is instructed; and
a progress status outputting step to display an image corresponding to the progress information acquired in the progress information acquiring step, the displayed image associated to a tab corresponded to the predetermined content information on the display screen, wherein in the tab display control step, a plurality of tab bars respectively corresponding to the tabs are displayed;
in the progress status outputting step, the image corresponding to the progress information is displayed on the tab bar to which the predetermined content information is corresponded,
the image corresponding to the progress information includes a read-in display bar which displays a degree of the progress of the processing recognizably,
the progress information acquiring step includes a progress status calculating step to calculate a progress status for the processing,
a length of the tab bar corresponding to the active tab is longer than a length of the other tab bar,
a length of the read-in display bar is changed in accordance with the calculated progress status,
the length of the read-in display bar is changed in accordance with whether the tab is active or not, and wherein
the length of the read-in display bar is '0' when the degree of the progress of the processing corresponds to 0% and the length is almost equal to a longitudinal length of the tab bar with the read-in display bar when the degree of the progress of the processing corresponds to 100%, regardless of whether the tab corresponding to the tab bar with the read-in display bar is active or not.

10. A screen display apparatus comprising:
a screen display program recorded on a non-transitory computer-readable medium;
reception instructing means for instructing reception of content information;
receiving means for receiving content information in response to the instruction from the reception instructing means;
tab display control means for displaying a plurality of tabs in a display screen;
correspondence setting means for corresponding the content information received to any one of the plurality of tabs;
image storage means;
drawing means for generating a content image by drawing the content information received and for storing the content image in the image storage means;
content image display control means for displaying a content image of content information corresponding to an active tab selected from the plurality of tabs, in an area of the display screen other than display areas for the plurality of tabs;
progress information acquiring means for acquiring a progress information for processing of at least one or more of receiving, drawing, and storing of predetermined content information for which reception is instructed; and
progress status outputting means for displaying an image corresponding to the progress information acquired by the progress information acquiring means, the displayed image associated to a tab corresponded to the predetermined content information on the display screen, wherein
the tab display control means displays a plurality of tab bars respectively corresponding to the tabs;
the progress status outputting means displays the image corresponding to the progress information on the tab bar to which the predetermined content information is corresponded,
the image corresponding to the progress information includes a read-in display bar which displays a degree of the progress of the processing recognizably, the progress information acquiring step includes a progress status calculating step to calculate a progress status for the processing, a length of the tab bar corresponding to the active tab is longer than a length of the other tab bar, a length of the read-in display bar is changed in accordance with the calculated progress status, the length of the read-in display bar is changed in accordance with whether the tab is active or not, and wherein the length of the read-in display bar is '0' when the degree of the progress of the processing corresponds to 0% and the length is almost equal to a longitudinal length of the tab bar with the read-in display bar when the degree of the progress of the processing corresponds to 100%, regardless of whether the tab corresponding to the tab bar with the read-in display bar is active or not.

11. A screen display method comprising:

reading a screen display program recorded on a computer-readable recording medium;

instructing reception of content information;

receiving content information in conformity with the instruction;

displaying a plurality of tabs in a display screen;

corresponding the received content information to any one of the plurality of tabs;

generating a content image by drawing the received content information and storing the content image;

displaying a content image of content information corresponding to an active tab selected from the plurality of tabs, in an area of the display screen other than display areas for the plurality of tabs;

acquiring progress information for processing of at least one or more of receiving the predetermined content information, generating the content image, and storing the content image; and displaying an image corresponding to the acquired progress information, the displayed image associated to a tab corresponded to the predetermined content information on the display, wherein a plurality of tab bars respectively corresponding to the tabs are displayed;

the image corresponding to the progress information is displayed on the tab bar to which the predetermined content information is corresponded, the image corresponding to the progress information includes a read-in display bar which displays a degree of the progress of the processing recognizably, the progress information acquiring step includes a progress status calculating step to calculate a progress status for the processing, a length of the tab bar corresponding to the active tab is longer than a length of the other tab bar, a length of the read-in display bar is changed in accordance with the calculated progress status, the length of the read-in display bar is changed in accordance with whether the tab is active or not, and wherein the length of the read-in display bar is '0' when the degree of the progress of the processing corresponds to 0% and the length is almost equal to a longitudinal length of the tab bar with the read-in display bar when the degree of the progress of the processing corresponds to 100%, regardless of whether the tab corresponding to the tab bar with the read-in display bar is active or not.

\* \* \* \* \*

UNITED STATES PATENT AND TRADEMARK OFFICE
CERTIFICATE OF CORRECTION

| | |
|---|---|
| PATENT NO. | : 8,949,732 B2 |
| APPLICATION NO. | : 13/033581 |
| DATED | : February 3, 2015 |
| INVENTOR(S) | : Yodo et al. |

It is certified that error appears in the above-identified patent and that said Letters Patent is hereby corrected as shown below:

On the Title Page

On Page 1, in the left hand column, item (73) in the Assignees, Line 2, delete "Entertainmant" and insert --Entertainment--, therefor.

Signed and Sealed this
Fourteenth Day of July, 2015

Michelle K. Lee
*Director of the United States Patent and Trademark Office*